United States Patent
Kaga

(10) Patent No.: US 9,260,909 B2
(45) Date of Patent: Feb. 16, 2016

(54) COVER UNIT INCLUDING A LOCK MECHANISM

(71) Applicant: Ryohta Kaga, Meguro-ku (JP)

(72) Inventor: Ryohta Kaga, Meguro-ku (JP)

(73) Assignee: RICOH COMPANY, LTD., Tokyo (JP)

( * ) Notice: Subject to any disclaimer, the term of this patent is extended or adjusted under 35 U.S.C. 154(b) by 281 days.

(21) Appl. No.: 13/690,880

(22) Filed: Nov. 30, 2012

(65) Prior Publication Data

US 2013/0141637 A1  Jun. 6, 2013

(30) Foreign Application Priority Data

Dec. 1, 2011 (JP) ................. 2011-263761

(51) Int. Cl.
| | |
|---|---|
| H04N 5/225 | (2006.01) |
| G03B 17/00 | (2006.01) |
| E05B 3/00 | (2006.01) |
| H02B 1/00 | (2006.01) |
| G06F 1/16 | (2006.01) |

(Continued)

(52) U.S. Cl.
CPC . E06B 7/22 (2013.01); E05C 1/004 (2013.01); E05C 1/10 (2013.01); E05C 3/004 (2013.01); G03B 17/02 (2013.01); H04N 5/2252 (2013.01); E05B 63/20 (2013.01);

(Continued)

(58) Field of Classification Search
CPC ............. E06B 7/22; E05C 1/004; E05C 1/10; E05C 3/004; H04N 5/2252; G03B 17/02; G03B 2217/002; G03B 2217/007; Y10T 292/0997; Y10T 292/0925; E05B 63/20
USPC .................. 348/373–376, 207.99; 396/5, 12, 396/419–428, 535–541; 49/394–395; 386/358–362; 429/96–100; 361/600, 361/679.01–679.45, 679.57–679.58
See application file for complete search history.

(56) References Cited

U.S. PATENT DOCUMENTS

| | | | | |
|---|---|---|---|---|
| 4,763,300 A | * | 8/1988 | Yukawa .................. | G06F 1/183 273/148 B |
| 5,657,081 A | * | 8/1997 | Kurahashi .............. | G06K 13/08 348/231.7 |

(Continued)

FOREIGN PATENT DOCUMENTS

| | | |
|---|---|---|
| JP | 11-271859 A | 10/1999 |
| JP | 2003-107569 | 4/2003 |

(Continued)

OTHER PUBLICATIONS

Japanese OA mailed on Jun. 9, 2015, in JP Patent Application No. 2011-263761.

*Primary Examiner* — Pritham Prabhakher
(74) *Attorney, Agent, or Firm* — Oblon, McClelland, Maier & Neustadt, L.L.P.

(57) ABSTRACT

A cover unit includes a cover element for a chamber of a chassis, rotatably supported at one end of the opening and a lock mechanism to lock the cover element in the chassis. The lock mechanism includes a lock element movable in parallel between a lock position and a release position, and having a latch portion to protrude from the cover element at the lock position, an elastic element to press the lock element to the lock position, a hole to receive the latch portion protruding from the cover element and restrict a movement of the latch portion, a receive element to hold the lock element in the release position against the elastic element, and a protrusion to press the receive element when the cover element is pressed onto the opening. The receive element releases the lock element from the release position, when pressed in the orthogonal direction.

11 Claims, 17 Drawing Sheets

(51) Int. Cl.
*H05K 5/00* (2006.01)
*H05K 7/00* (2006.01)
*H01M 2/10* (2006.01)
*E06B 7/22* (2006.01)
*E05C 1/00* (2006.01)
*E05C 1/10* (2006.01)
*E05C 3/00* (2006.01)
*G03B 17/02* (2006.01)
*E05B 63/20* (2006.01)

(52) U.S. Cl.
CPC .... *G03B 2217/002* (2013.01); *G03B 2217/007* (2013.01); *Y10T 292/0925* (2015.04); *Y10T 292/0997* (2015.04)

(56) References Cited

U.S. PATENT DOCUMENTS

| | | | | |
|---|---|---|---|---|
| 7,372,501 | B2 * | 5/2008 | Fujii | G03B 17/04 348/373 |
| 7,466,912 | B2 * | 12/2008 | Ishikawa | H01M 2/1027 348/373 |
| 2005/0026035 | A1 * | 2/2005 | Ishikawa | H01M 2/1027 429/100 |
| 2010/0194975 | A1 | 8/2010 | Murakami | |
| 2010/0265388 | A1 * | 10/2010 | Soumi | G03B 17/02 348/374 |
| 2010/0297485 | A1 | 11/2010 | Ren et al. | |
| 2011/0102668 | A1 | 5/2011 | Kaga et al. | |
| 2011/0109790 | A1 | 5/2011 | Shinohara et al. | |
| 2011/0199720 | A1 * | 8/2011 | Kajiyama | B65D 53/00 361/679.01 |
| 2011/0216237 | A1 | 9/2011 | Shinohara et al. | |
| 2011/0298970 | A1 | 12/2011 | Shinohara et al. | |
| 2012/0154665 | A1 | 6/2012 | Kaga et al. | |

FOREIGN PATENT DOCUMENTS

| | | |
|---|---|---|
| JP | 2004-146618 A | 5/2004 |
| JP | 2008-042771 | 2/2008 |
| JP | 2010-198003 | 9/2010 |

* cited by examiner

COVER UNIT INCLUDING A LOCK MECHANISM

CROSS REFERENCE TO RELATED APPLICATION

The present application is based on and claims priority from Japanese Patent Application No. 2011-263761, filed on Dec. 1, 2011, the disclosure of which is hereby incorporated by reference in its entirety.

BACKGROUND OF THE INVENTION

1. Field of the Invention

The present invention relates to a cover unit including a cover element to open/close.

2. Description of the Related Art

An electronic device generally includes a battery chamber to accommodate batteries as a power supply, for example. The battery chamber may be provided with an opening and a cover element supported at one end of the opening rotatably around the axis. The battery chamber is opened or closed by opening or closing the cover element.

Japanese Patent Application Publication No. 2010-198003 discloses a cover unit which can securely hold a cover element in a closed position while the cover element is pressed onto the edges of the opening. This cover unit includes a cover element, a lock element with a lever, and a protrusion. The lock element is provided in the cover element to rotate so that the protrusion protrudes from the cover element in accordance with a rotary position of the lock element. By pulling and turning the lever, the lock element is rotated to protrude the protrusion from the cover element and by fitting the protrusion into a groove of the opening, the cover element is held securely while pressed onto the edges of the opening with the lever resting on the side of the device body. Thus, the lever does not hinder a user from using the electronic device.

To lock the closed cover element, the lever needs to be pulled out and turned to rotate the lock element. In terms of operability and usability, there is a room for improvement.

Further, even with the cover element opened or not pressed onto the opening edges, the protrusion can be protruded from the cover element. The protrusion is preferably configured not to protrude from the cover element while the cover element is open.

SUMMARY OF THE INVENTION

The present invention aims to provide a cover unit which can prevent a protrusion from protruding from an opened cover element and can lock a closed cover element by simply rotating the cover element.

According to one aspect of the present invention, a cover unit includes a cover element to enclose an opening of a chamber of a chassis, rotatably supported at one end of the opening around an axis set at the one end, and a lock mechanism to lock the cover element in the chassis while the cover element is pressed onto an edge of the opening, the lock mechanism including a lock element contained in the cover element and movable in parallel between a lock position and a release position, and having a latch portion to protrude from the cover element at the lock position, an elastic element provided in the cover element to press the lock element to the lock position, a hole provided in the chassis, to receive the latch portion protruding from the cover element and restrict a movement of the latch portion in a direction orthogonal to a front surface of the cover element, a receive element provided in the cover element, to hold the lock element in the release position against the elastic element, and a protrusion provided in the chamber, to protrude in the orthogonal direction to press the receive element when the cover element is pressed onto the edge of the opening, in which the receive element is configured to release the lock element from the release position, when pressed in the orthogonal direction.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENTS

Figure 10:
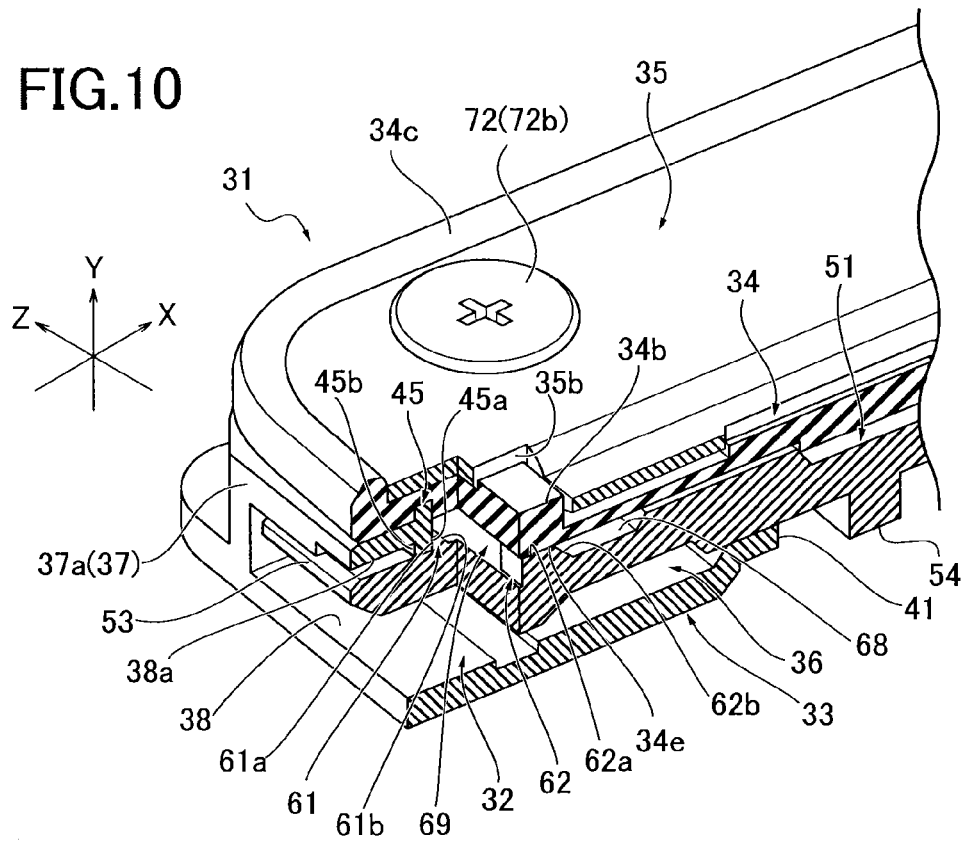
FIG. 10 is a perspective view of the battery chamber cover 31 and a lock mechanism 32 with the lock element 51 in a release position, partially showing the cross section of the essential part.
Figure 11:
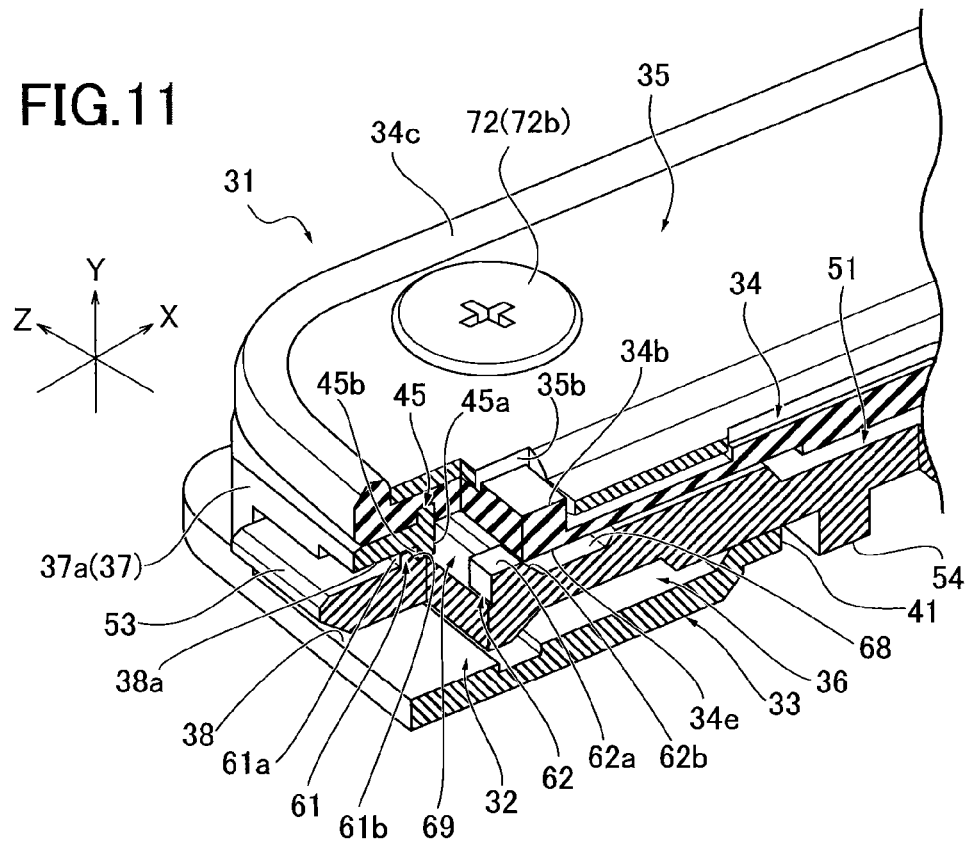
FIG. 11 shows the same as in FIG. 10 with the lock element 51 in a lock position.
Figure 12A:
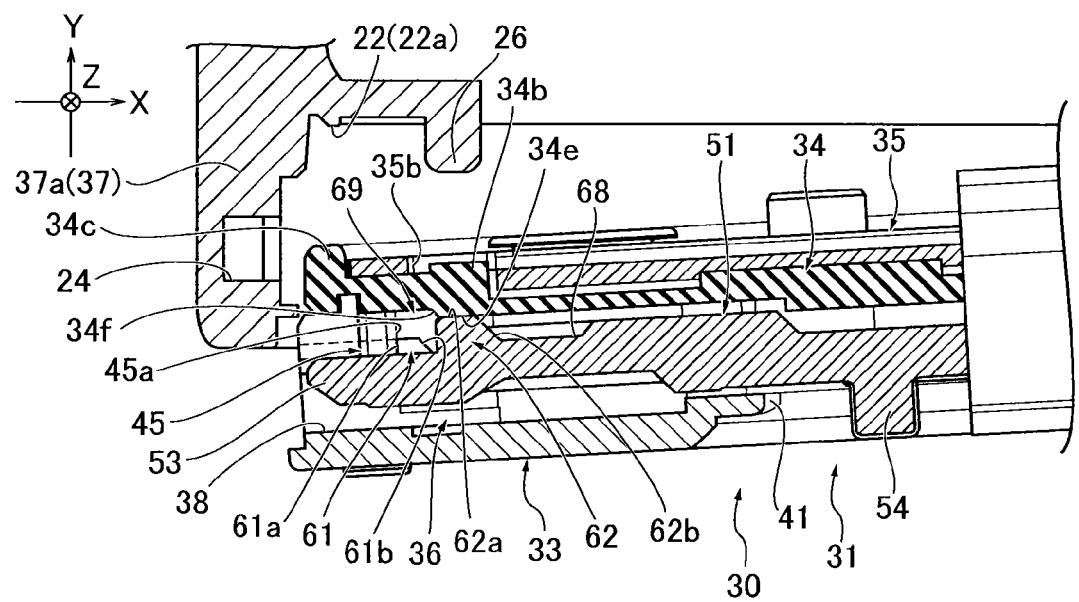
FIG. 12A is a cross section view of the cover unit 30 along the II to II line in FIG. 1 when the lock element 51 is in the release position and the battery chamber cover 31 is placed in a closed state from an opened state.
Figure 12B:
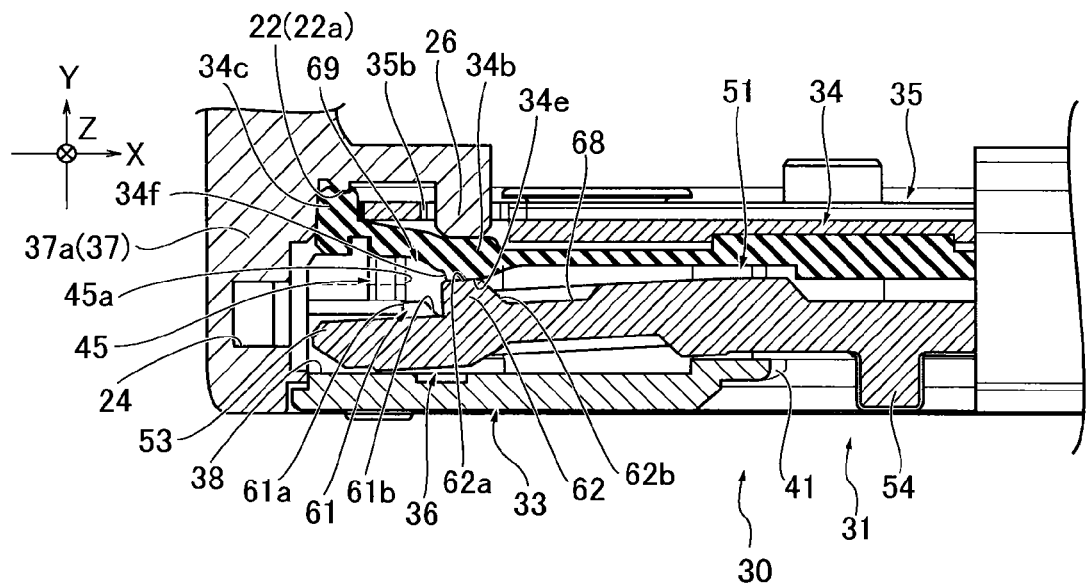
FIG. 12B is the same when the battery chamber cover 31 is closed and a pressed portion 62 is pressed by a protrusion 26 via a first convex 34 of a seal element 34.
Figure 12C:
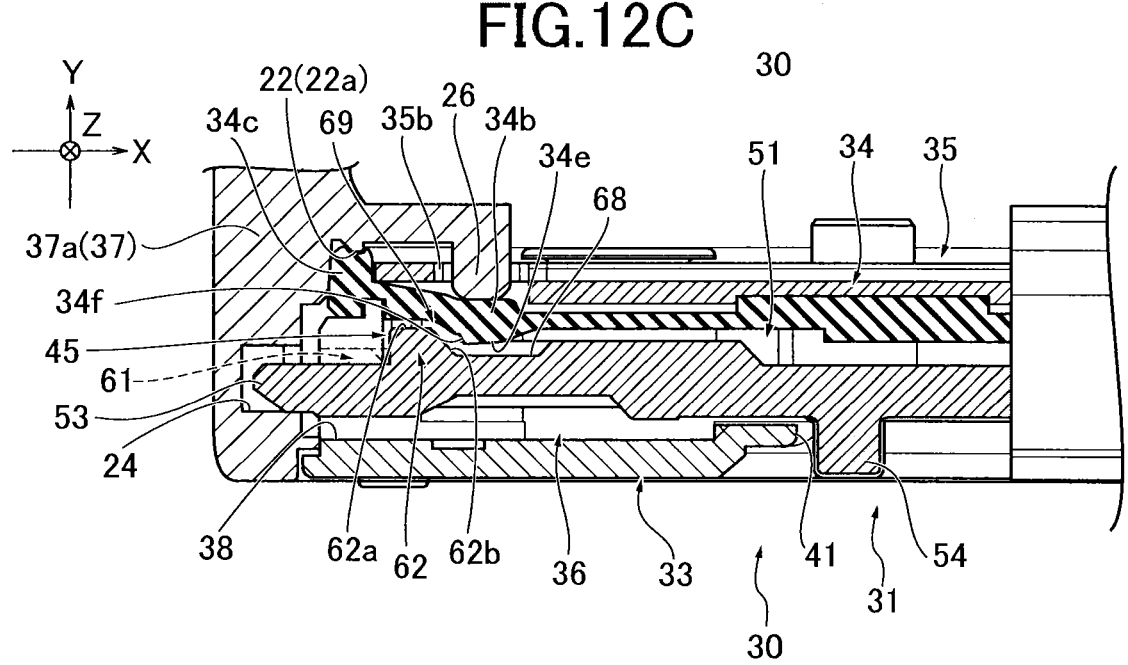
FIG. 12C is the same when the lock element is moved to the lock position.

Hereinafter, embodiments of a cover unit and an electronic device incorporating the same will be described in detail with reference to the accompanying drawings. Wherever possible, the same reference numbers will be used throughout the drawings to refer to the same or like parts.
First Embodiment A cover unit 30 and an imaging device 10 including the same as an example of the electronic device are described with reference to FIGS. 1 to 13. FIG. 6 omits showing the inner structure and outer surface of a battery chamber 17 in a chassis 11. FIG. 11 shows a lock element 51 in a lock position while a pressed portion 62 is not being pressed by a protrusion 26 for comparison with FIG. 10. FIGS. 12B, 12C emphatically shows the deformation of a seal element 34 and the lock element 51. In FIG. 13 the lock element 51 is indicated by dots for better understanding.

Figure 1:
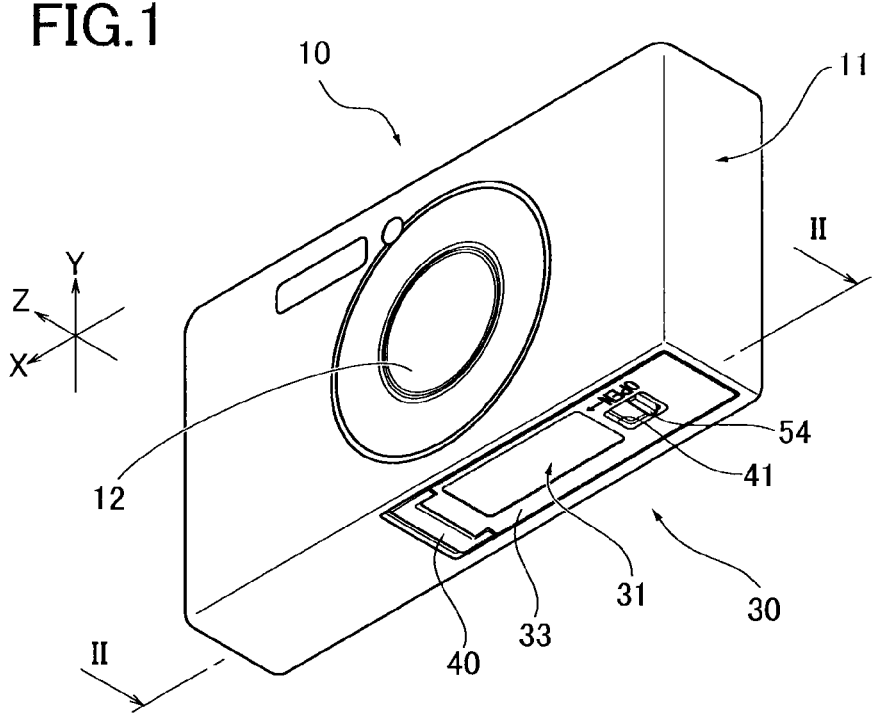
FIG. 1 is a perspective view of an imaging device 10 as one example of electronic device according to one embodiment, seen from below, with a battery chamber cover 31 closed.
Figure 2:
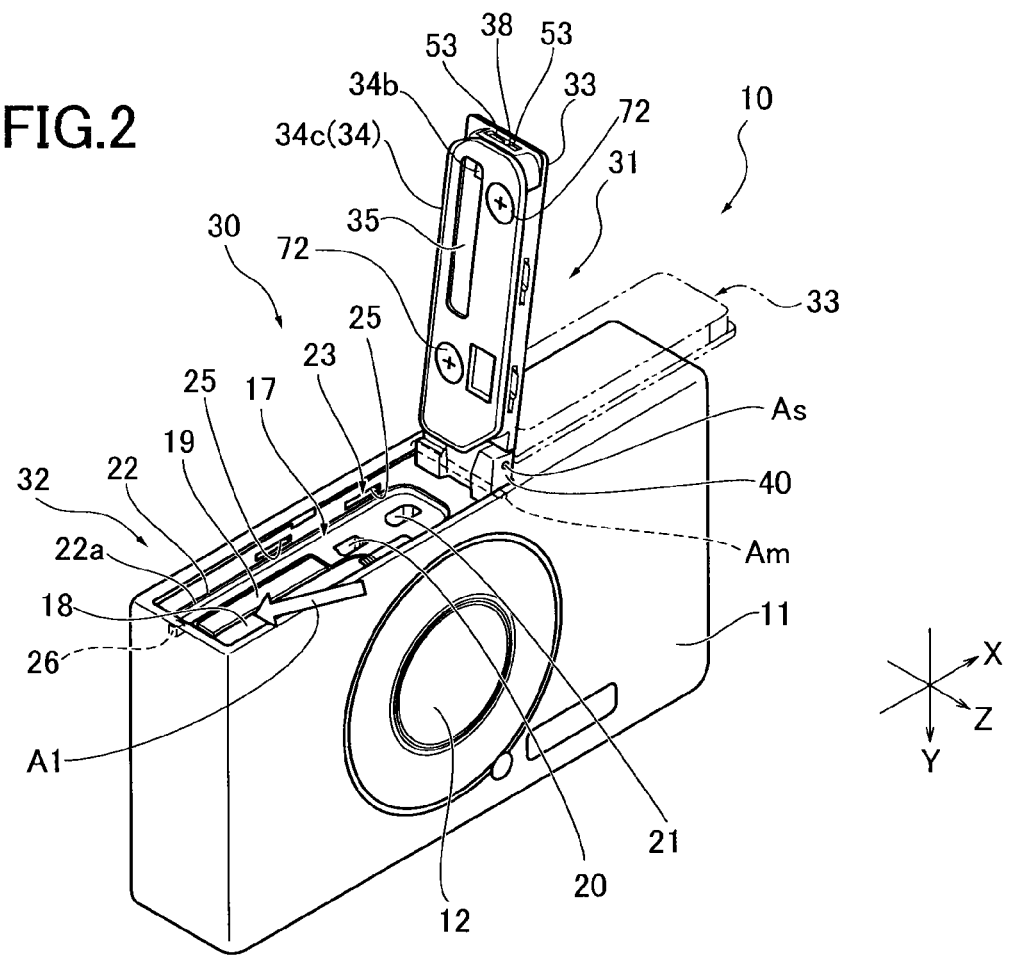
FIG. 2 is a perspective view of the imaging device 10 upside down with the battery chamber cover 31 opened, seen from below.

Referring to FIG. 1 and FIG. 2, the imaging device 10 includes a chassis 11 as a camera body in which an optical system 12 is mounted on a front side. Although not shown, the optical system 12 comprises a fixed lens, a zoom lens, a focus lens, a shutter unit, an aperture diaphragm unit, and a lens barrel movably containing these optical elements. It can move the optical elements to set a magnification and move the focus lens to adjust focus. The optical axis of the optical system 12 is orthogonal to the front face of the chassis 11 outside the chassis 11. Here, the optical axis of the optical system 12 is defined as Z axis, the vertical direction of the imaging device 10 in normal use is defined as Y axis, and a direction orthogonal to the two axes is defined as X axis. The positive side of Z axis is the front side of the imaging device 10, that of Y axis is the top side thereof, and that of X axis is the right side thereof.

Figure 3:
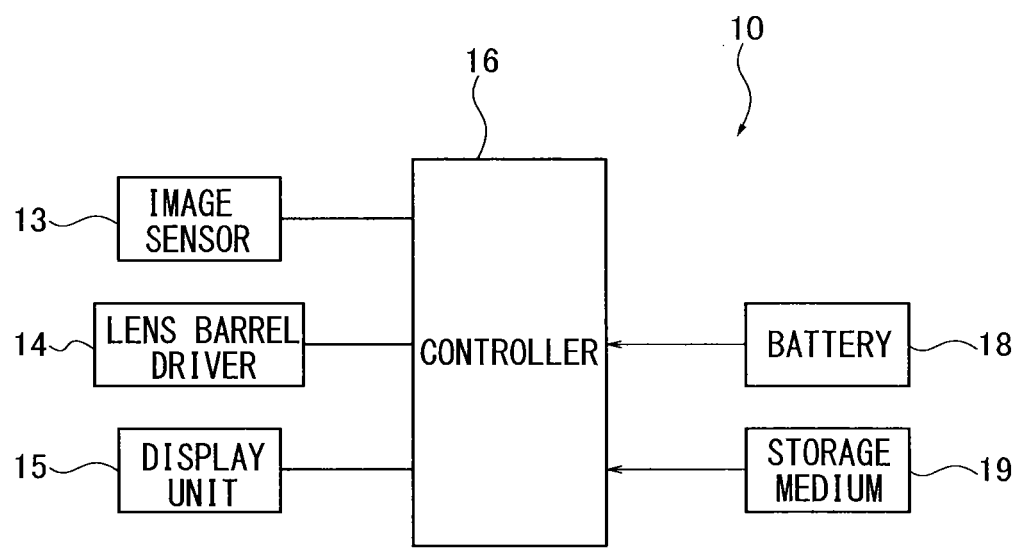
FIG. 3 is a block diagram of the structure of the imaging device 10.

In FIG. 3 the imaging device 10 includes an image sensor 13, a lens barrel driver 14, a display unit 15, and a controller 16. The image sensor 13 acquires an image of a subject formed by the optical system 12 and outputs image signals based on the image to the controller 16. The lens barrel driver 14 moves the optical elements of the optical system 12 via the lens barrel.

The controller 16 generates image data based on the signal from the image sensor 13, controls the driving of the lens barrel driver 14, and controls the elements in accordance with a manipulation of not-shown operation keys, for example. The controller 16 controls the display unit 15 to display the image acquired by the image sensor 13. The display unit is provided on the back face of the chassis 11. The image sensor 13, lens barrel driver 14, and display unit 15 are supplied with electric power from a battery 18 via the controller 16 for various operations. Further, the controller 16 can store or extract image data and other information in/from a storage medium 19 mounted in the battery chamber 17. It can also perform data communication with a not-shown external device via an external input/output terminal connected to a HDMI terminal 20 and a USB terminal 21 (FIG. 2).

The battery chamber 17 is an example of the chamber of the imaging device 10 as an electronic device. It is a space in which the battery 18 is mounted. When mounted, the battery 18 supplies power to the image sensor 13, lens barrel driver 14, display unit 15 and controller 16. In the present embodiment the battery chamber 17 can contain the storage medium 19 in addition to the battery 18 and include the HDMI (high-definition multimedia interface) terminal 20 and USB (universal serial bus) terminal 21. The HDMI terminal 20 and USB terminal 21 are connectable with external input/output terminals in compliance with their specifications for the data communication with the external device and controller.

The battery chamber 17 is an opening in the bottom of the chassis 11 and includes an inlet 22 which communicates with outside of the imaging device 10. The inlet 22 is configured to surround the mount spaces for the battery 18 and storage medium 19 and the HDMI terminal 20 and USB terminal 21, and is longer along X axis than along Z axis. A user can mount the battery 18 and storage medium 19 and connect to the HDMI terminal 20 and USB terminal 21 in the battery chamber 17 via the inlet 22. The inlet 22 can be closed with the cover unit 30.

Figure 7:
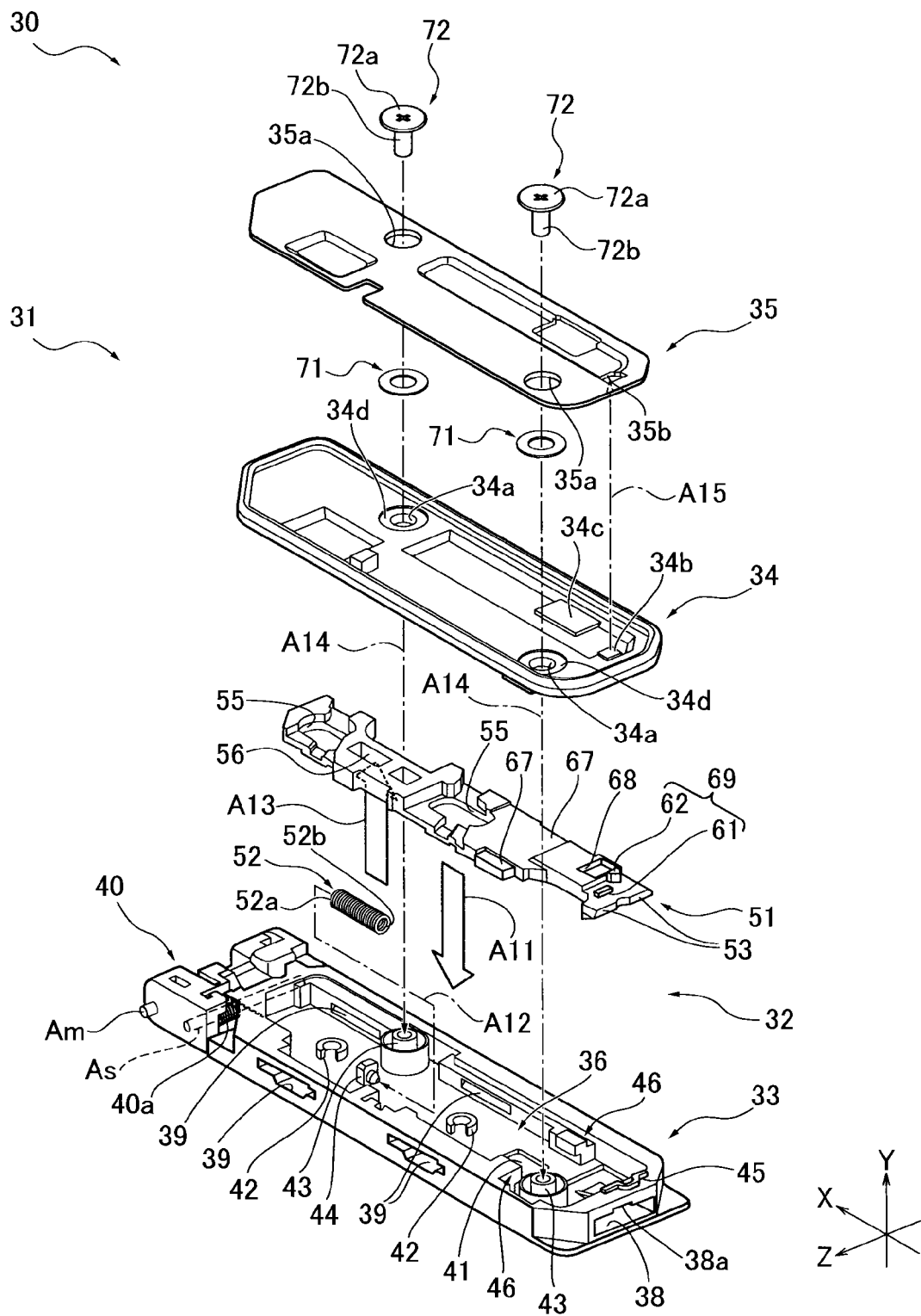
FIG. 7 is an exploded, perspective view of the structure of the battery chamber cover 31.

The cover unit 30 in FIG. 1 and FIG. 2 includes a battery chamber cover 31 and a lock mechanism 32 (FIG. 7). The battery chamber cover 31 is for closing the inlet 22 of the battery chamber 17, and the lock mechanism 32 can lock the battery chamber cover 31 in the chassis 11 with the cover pressed onto the inlet 22 and release it therefrom.

Figure 4:
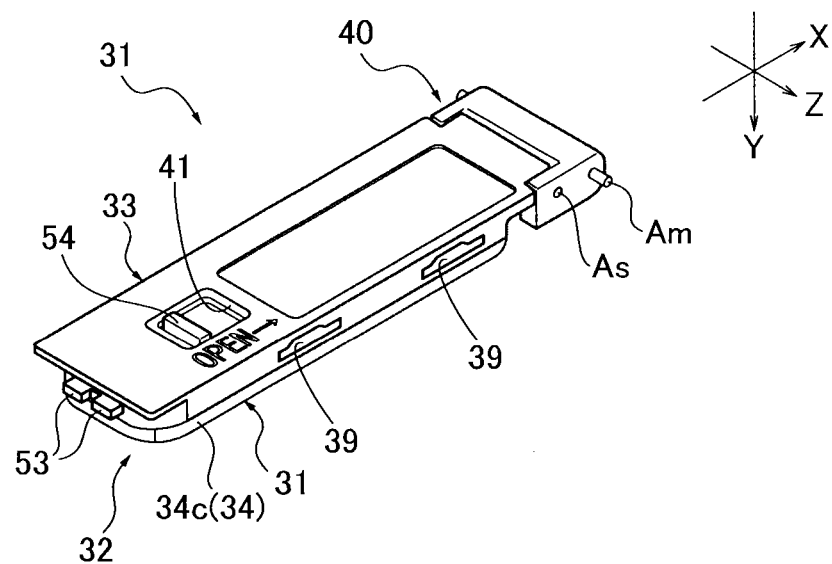
FIG. 4 is a perspective view of the outer wall of the battery chamber cover 31.
Figure 5:
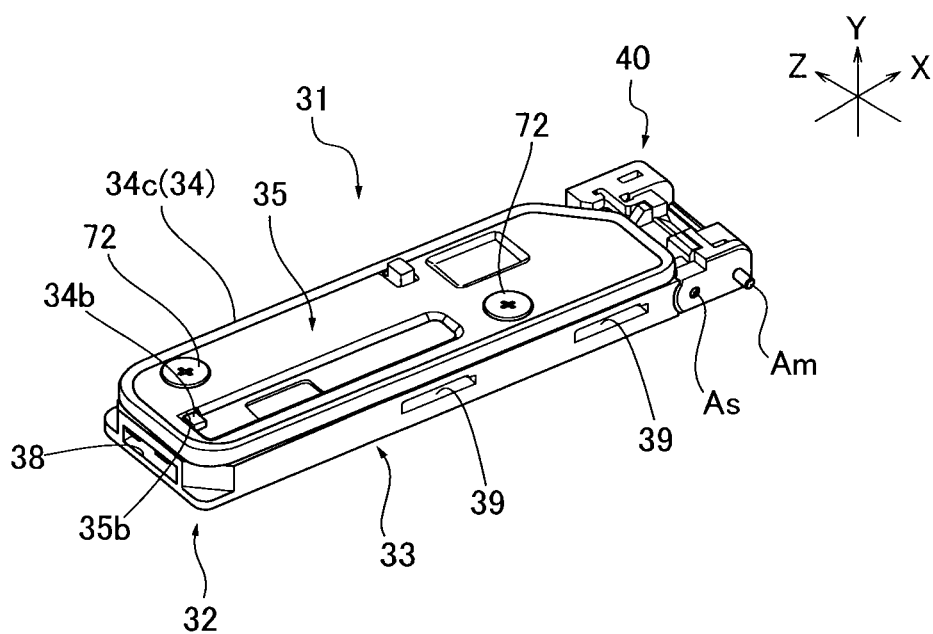
FIG. 5 is a perspective view of the inner wall of the battery chamber cover 31.
Figure 6:
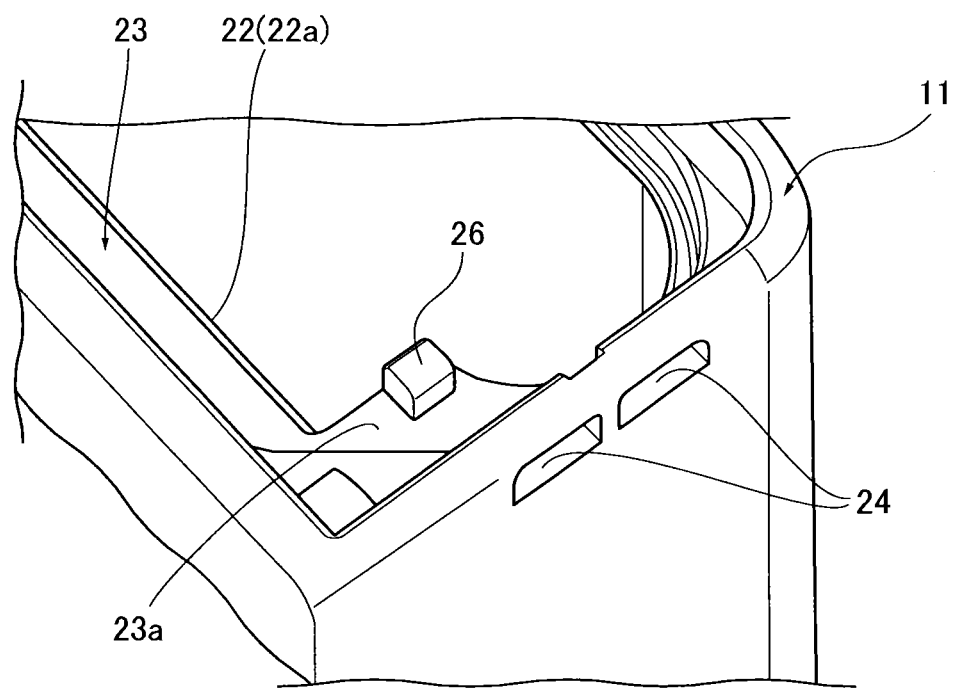
FIG. 6 shows a part of a battery chamber or an accommodation space 23 along the arrow A1 in FIG. 2.

The battery chamber cover 31 is a plate as shown in FIGS. 4, 5 and forms a planar surface along X to Y plane. Z axis is orthogonal to the plate. The length of the cover 31 when closed is along X axis, the width is along Z axis, and the thickness is along Y axis. The length and width directions of the cover 31 coincide with those of the battery chamber 17 and inlet 22, and the thickness direction thereof is the depth of the battery chamber 17.

The battery chamber cover 31 is provided in the bottom face of the chassis 11 to be rotatable around a shaft Am which is set at one end of the length of the inlet 22 and extends along Z axis. In the present embodiment the battery chamber cover 31 is accommodated in an accommodation space 23 in the bottom face of the chassis 11. When covering the inlet 22, the battery chamber cover 31 is contained in the accommodation space 23 and forms a part of the bottom face of the chassis in FIG. 1. The accommodation space 23 is below the battery chamber 17 and between the battery chamber and the outside of the chassis 11. The inlet 22 of the battery chamber 17 opens the back wall of the accommodation space 23 and communicates with the outside of the imaging device 10 via the accommodation space 23.

The chassis 11 includes holes 24 in the inner wall of the accommodation space 23 on the opposite side of the shaft Am (FIGS. 6, 12A-12C, 13A-13C). The holes 24 are to receive a two-pronged of the lock element 51 and restrict the latch portion 53 from moving along −Y axis. The number of holes 24 are two disposed in parallel along Z axis for the latch portion 53 in the present embodiment. Note that in FIG. 6 the holes 24 open the outer surface of the chassis 11.

Further, the chassis 11 includes four grooves 25 (FIG. 2, FIG. 13A-13C) in two pairs in the inner walls of the accommodation space 23 at two middle positions with an interval along the X axis. The four grooves 25 are at the same height as the holes 24 in the chassis 11.

Further, the chassis 11 includes a protrusion 26 in the accommodation space 23 at a position to contact a later-described receive element 69 when the battery chamber cover 31 is closed. The protrusion 26 is configured to relatively press a pressed portion 62 of the receive element 69 along −Y axis in FIG. 12, when the battery chamber cover 31 is closed. It protrudes along the thickness of the battery chamber cover 31 in a front wall 23a of the accommodation space 23. The front wall 23a defines the bottom wall of the accommodation space 23 or the inlet 22 of the battery chamber 17.

Figure 8A:
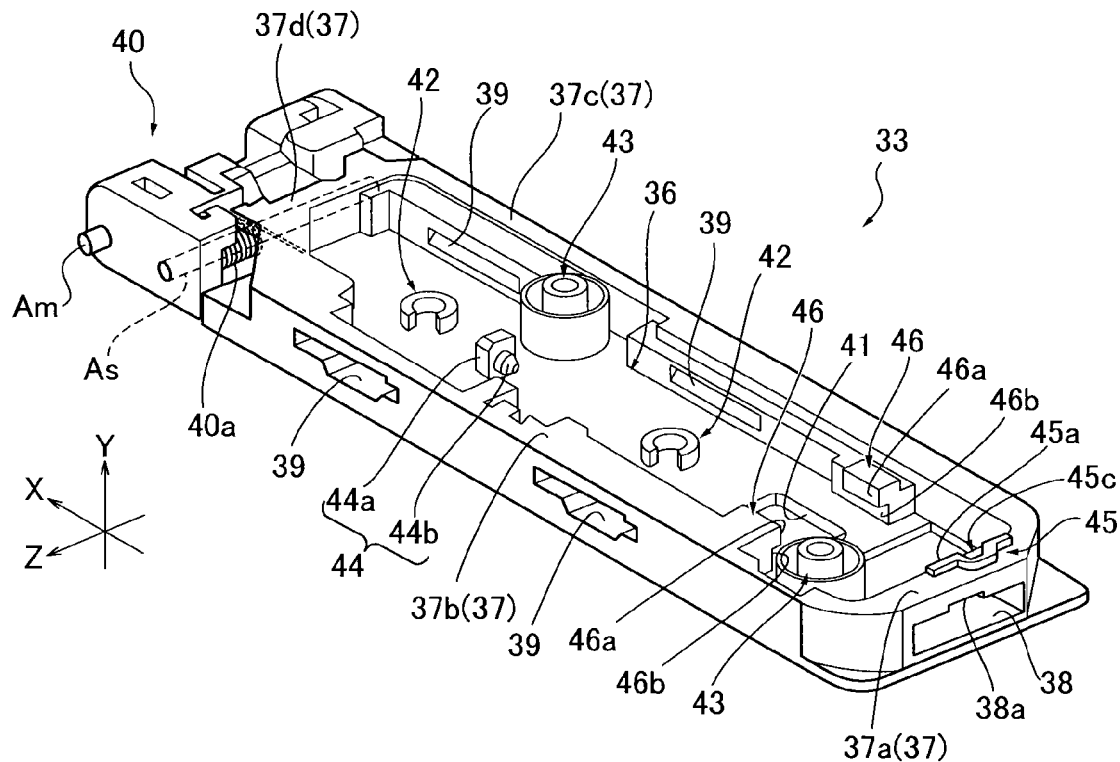
FIG. 8A is a perspective view of a cover body 33, seen from +Y axis.

As shown in FIGS. 4, 5, 7, the cover 31 has a cover body 33, a seal element 34, and a plate 35 and includes a lock element 51 movable in parallel. The cover body 33 in FIG. 8 is a rectangular plate with short sides on Y axis and long sides on X axis and defines the outer shape of the cover 31. The cover body 33 includes a depression 36 to receive the lock element 51 in an outer circumference wall 37 of the back face. The size and shape of the outer circumference wall 37 are equal to those of the inlet 22 of the battery chamber 17, and the wall 37 is pressed by the edge 22a of the inlet 22 (FIG. 2).

A hole 38 and four notches 39 are provided in the outer circumference wall 37. The hole 38 is provided at one end 37a to penetrate through the outer circumference wall 37 along X axis, to allow the latch portion 53 of the lock element 51 to protrude therethrough from the cover body 33. With the battery chamber cover 31 closed, the hole 38 faces the holes 24 along X axis. The hole 38 includes a clearance groove 38a at a middle position of the inner circumference wall to extend along X axis. A front end 45b of a contact portion 45 is provided at one end of the outer circumference wall 37 near the depression 36 (FIGS. 10, 11).

The notches of two pairs 39 are formed in the two short sides 37b, 37c of the outer circumference wall 37, respectively. Also, they are arranged with an interval at a middle position in the length direction of the cover body 33. With the battery chamber cover 31 closed, the notches 39 face the grooves 25 of the chassis 11 along Z axis.

The cover body 33 is joined at one end with a shock absorber 40 via an auxiliary shaft which extends through one side 37d of the outer circumference wall 37d and around which a torsion spring 40a is wound. The shock absorber 40 is rotatable at the other end around the auxiliary shaft As. The rotational range of the cover body 33 and shock absorber 40 is from the alignment of the outer surfaces of both elements on the same plane (FIGS. 2, 4) to their positions approximately orthogonal to each other (indicated by the two-dot chain line in FIG. 2). The cover body 33 and shock absorber 40 are relatively turned around the auxiliary shaft As by the torsion spring 40a to the position that they are aligned on the same plane.

The shock absorber 40 in FIG. 2 is rotatably placed at one end of the accommodation space 23 via the shaft Am which protrudes from one end of the shock absorber 40. It is rotatable around the shaft Am relative to the accommodation space 23.

The outer surface of the cover body 33 including the shock absorber 40 is aligned with the bottom face of the chassis 11, and it forms a part of the outer wall of the battery chamber cover 31 and the bottom face of the chassis 11.

Further, in FIG. 8 the cover body 33 comprises an opening 41 in the bottom wall of the depression 36. The opening 41 is rectangular and penetrates through the bottom wall along Y axis, through which the protrusion 54 of the lock element 51 protrudes along Y axis and moves along X axis relative to the cover body 33 (FIGS. 10 to 12). Thus, the opening 41 opens a part of the outer surface of the cover body 33 or a part of the bottom face of the chassis 11, so that the outside of the cover body 33 is communicated with the depression 36.

The depression 36 is formed at the center of the back side of the cover body 33 and two bearings 42, two screw holes 43, an elastic element mount 44, and a contact portion 45, and a guide 46 are provided therein. The bearings 42 are C-shaped, protrude along the thickness of the battery chamber cover 31, and include a cut-off portion within 180 degree region around the center axis. They are arranged with an interval at a middle position of the cover body 33, and positioned at almost the center of the two pairs of notches 39 of the outer circumference walls 37b, 37c.

The two screw holes 43 are columnar and protrude to fix the seal element 34 and the plate 35 to the cover body 33, and include grooves to engage with a thread 72a of a screw 72 (FIG. 7). They are placed with an interval in the depression 36.

The elastic element mount 44 is for attaching a later-described coil spring 52 to the cover body 33. It includes a base 44a protruding along +Y axis and a columnar convex 44b protruding from the base 44a along −X axis. The convex 44b is inserted into the coil spring 52. The elastic element mount 44 is positioned at one end of an elastic element holder 56 of the lock element 51 while the lock element 51 is accommodated in the depression 36 of the cover body 33.

Figure 8B:
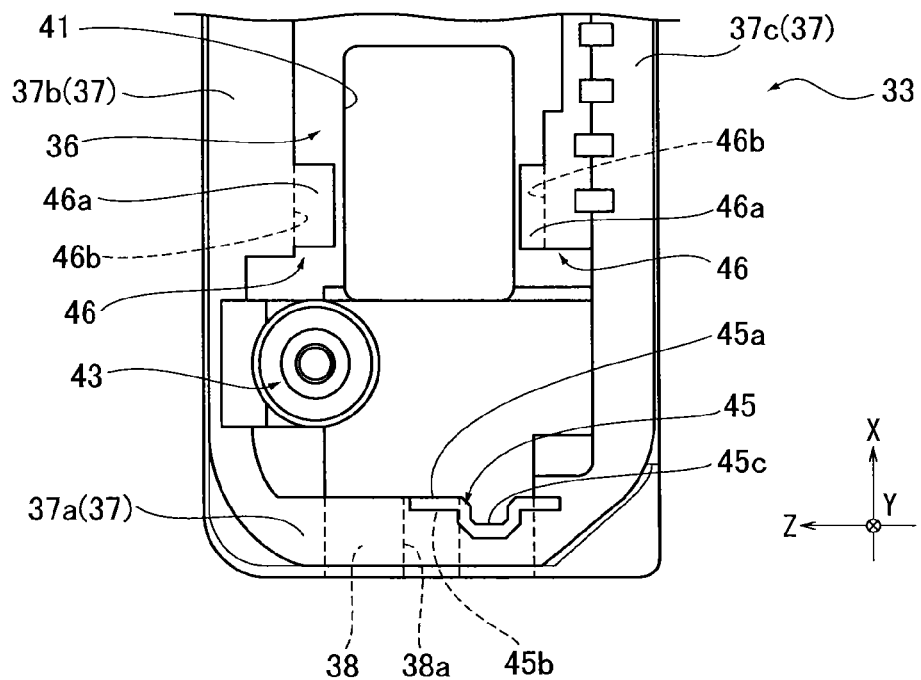
FIG. 8B is a plan view of the same.

The contact portion 45 is a plate formed in the outer circumference wall 37a above the hole 38 to contact the front end 61a of a convex 61 of the lock element 51 (FIG. 9). The contact portion 45 includes a back portion 45a extending along Y to Z plane to hit the convex 61, a protruded portion at a center as shown in FIG. 8B, and a front portion 45b extending along Y to Z plane and defining one end of the clearance groove 38a of the hole 38. The wall of the back portion 45a and front portion 45b relatively protrudes from the outer circumference wall 37a due to the clearance groove 38a of the hole 38 (FIGS. 10, 11). The protruded portion of the contact portion 45 also forms a concave portion 45c.

The guide 46 is provided in a pair at one end of the depression 36 to define the moving direction of the lock element 51 in the depression 36. Each of the guides 46 includes a protruded portion 46a and a groove 46b between the protruded portion 46a and the bottom face of the depression 36. The groove 46b extends along X axis to move the protrusion 67 of the lock element 51 (FIGS. 9A to 9C) along X axis, prevent it from moving along Z axis and limiting the moving amount thereof along Y axis. Thus, the guides 46 allow the lock element 51 to move in parallel along X axis in the depression 36.

The seal element 34 in FIG. 7 is attached to the back face of the cover body 33 to cover the depression 36. It is made from an elastic material and of an outer shape to accord with the top end of the cover body 33. The seal element 34 can cover the depression 36 entirely. It includes two screw holes 34a, a first convex 34b, and a second convex 34c.

The two screw holes 34a with a circular cross section penetrate through the seal element 34 along Y axis for fixing the seal element 34 in the cover body 33. A screw shaft 72a is inserted through the screw holes 34a. The screw holes 34a are positioned to face the screw holes 43 of the depression 36 along Y axis. In the present embodiment ring-like concaves 34d to surround the screw holes 34a are provided in the back face of the seal element 34 for placing metal washers 71.

The first convex 34b is placed on the back face of the seal element 34 between the protrusion 26 in the accommodation space 23 and the pressed portion 62 of the lock element 51. It is disposed to be adjacent to the pressed portion 62 in the assembled battery chamber cover 31 when the lock element 51 is in the release position. The height or projection amount thereof is lower than the back face of the plate 35. In the present embodiment the size thereof is set to occupy an extremely small area of the inner wall of the assembled battery chamber cover 31. The extremely small area refers to an area smaller than the average size of the fingertip of a person, for example.

The second convex 34c protrudes from the entire circumference of the back face of the seal element 34. When the battery chamber cover 31 is closed, the second convex 34c is pressed inside of the inlet 22 and deformed to come between the cover body 33 and edge 22a and closely attach to the edge 22a (FIGS. 12A to 12C). That is, the cover body 33 is tightly pressed onto the inlet 22 to enclose the inlet 22 and prevent foreign matter such as dust and mote from entering the battery chamber 17. In the present embodiment the battery chamber cover 31 exerts a watertight structure while it is pressed onto the inlet 22.

Further, the seal element 34 as shown in FIGS. 12A to 12C includes a plan surface 34e on the front side opposite to the first convex 34b, and an inclined surface 34f continuous to the plan surface 34e and extending to the +X axis side.

In FIG. 7 the plate 35 defines the inner wall of the battery chamber cover 31 forming the inlet 22 and is made from a metal material in a shape to match with the inside of the second convex 34c of the seal element 34. Thus, only the second convex 34c can be exposed from the back side of the seal element 34 to which the plate 35 is attached (FIG. 5). The plate 35 is provided with two screw holes 35a and an opening 35b.

The two screw holes 35a with circular cross sections penetrate through the plate 35. The plate 35 is attached to the cover body 33 with the screws 72 inserted into the screw holes 35a. They are positioned to face the two screw holes 34a of the seal element 34 and those 43 of the depression 36 along Y axis.

In the opening 35b the pressed portion 62 of the lock element 51 is pressed by the protrusion 26 of the accommodation space 23 via the first convex 34b of the seal element 34 in FIG. 12. The opening 35b penetrates through the plate 35 along Y axis and has a rectangular cross section. The first convex 34b is inserted from the front surface of the plate 35 through the opening 35b to expose from the back surface of the plate 35. The opening 35b is positioned to contact the protrusion 26 when the assembled battery chamber cover 31 in FIGS. 7, 10 is closed.

The seal element and plate 35 are attached to the cover body 33 to constitute the battery chamber cover 31. In the battery chamber cover 31 the cover body 33 and the shock absorber 40 are integrally rotatable around the shaft Am relative to the battery chamber 17. The cover body 33 is pressed onto the inlet edge 22a of the battery chamber 17 via the second convex 34c of the seal element 34 to close the inlet 22 and form a part of the bottom face of the chassis 11 (FIG. 1). The second convex 34c is compressed between the cover body 33 and the edge 22a and tightly attached to the edge 22a. This refers to a closed state of the battery chamber cover 31. The inlet 22 is exposed by moving the cover body 33 and shock absorber 40 away from the bottom surface of the chassis 11. This refers to an opened state of the battery chamber cover 31. Thus, the battery chamber cover 31 opens/closes the battery chamber 17.

Further, applied with unexpected force in the closed state, the cover body 33 is configured to rotate around the auxiliary shaft As relative to the shock absorber 40 as indicated by the two-dot chain line in FIG. 2. This prevents from a failure or damage in the battery chamber cover 31. The lock mechanism 32 is provided to lock the battery chamber cover 31 in the closed state.

The lock mechanism 32 in FIG. 7 includes the lock element 51 in the depression 36 and the coil spring 52. The lock element 51 is a long plate including the two-pronged latch portion 53 at one end, the protrusion 54, two through holes 55, and elastic element holder 56 on the front face in FIG. 9A. The latch portion inserts through the hole 38 of the depression 36 into the two holes 24 of the chassis 11 in FIGS. 13A to 13C.

The protrusion 54 is disposed between the latch portion 53 and the through holes 55 to protrude from the opening 41 of the cover body 33 while the lock mechanism 51 is accommodated in the depression 36 of the cover body 33. It is movable in the opening 41 along X axis. In the present embodiment the protrusion is a cuboid in a length along Z axis longer than that along X axis. The two through holes 55 are provided at one side of the lock element 51.

The through holes 55 penetrate through the thickness of the lock element 51 and are associated with the two bearings 42 of the cover body 33. They are formed to allow the two bearings 42 to relatively move along X axis.

The elastic element holder 56 penetrates through the thickness of the lock element 51 between the two through holes 55, and has an inner space as a long cuboid. It can accommodate, at one end, the elastic element mount 44 receiving the compressed coil spring 52 while the lock element 51 is placed in the depression 36, as shown in FIG. 7. The elastic element holder 56 receives one end 52b of the coil spring 52 at one end 56a, and includes, at a middle position, a piece 56b crossing the opening of the back face to prevent a falling-off of the coil spring 52 (FIG. 9B).

Figure 9A:
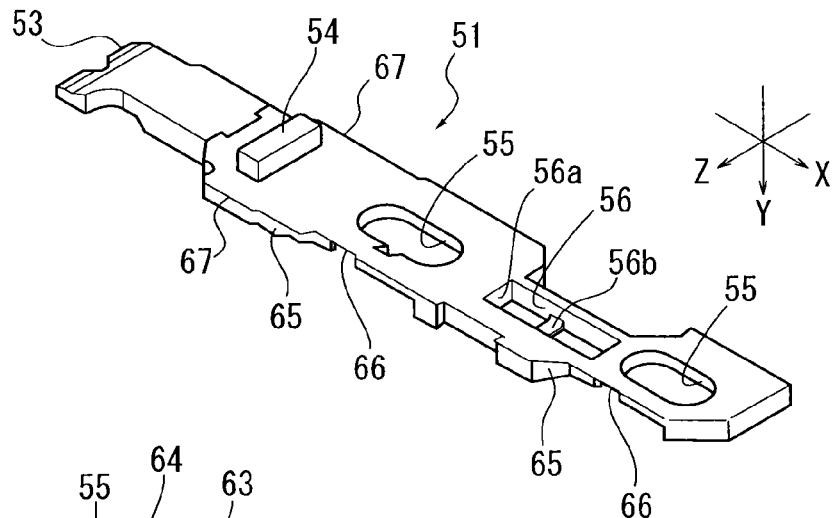
FIG. 9A is a perspective view of the back side of a lock element 51.
Figure 9B:
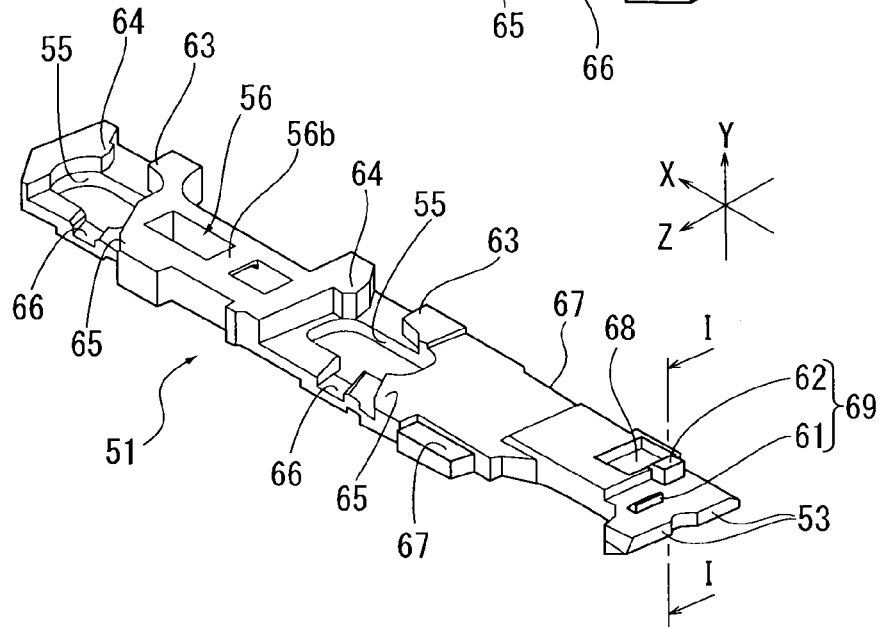
FIG. 9B is a perspective view of the front side thereof.

Further, the lock element 51 includes the convex 61, pressed portion 62, release-side walls 63, lock-side walls 64, wall stops 65, grooves 66, a pair of guides 67, and a concave 68 on the back side in FIG. 9B. The convex 61 stands on one end of the lock element 51. The front face 61a of the convex 61 is inclined upward in FIG. 9C and the rear face 61b is inclined relative to the front face 61a. The convex 61 is disposed so that the front face 61a can hit the back portion 45a of the contact portion 45 when the lock element 51 is at a release position, and the rear face 61b can face the front portion 45b of the contact portion 45 along X axis when the lock element 51 is at a lock position.

The pressed portion 62 is a protrusion near the convex 61. Pressed by the protrusion 26 on the accommodation space 23 via the first convex 34b of the seal element 34, the pressed portion 62 is moved along Y axis to move the convex 61 away from the back portion 45a of the contact portion 45. The top face 62a of the pressed portion is planar along X to Z plane and the planar rear face 62b is inclined from the top face 62a. When the lock element 51 is in the release position in the battery chamber cover 31, the top face 62a abuts with the plan surface 34e of the concave portion 45c of the contact portion 45 as shown in FIGS. 10, 12A, 12B. With the lock element 51 in the lock position, the pressed portion 62 is surrounded by the concave portion 45c in FIG. 13B and positioned so that the rear face 62b faces the inclined surface 34f along X axis.

The release-side walls 63, lock-side walls 64, wall stops 65, and grooves 66 are provided in association with the two through holes 55 in FIG. 9B. The first and lock-side walls 63, 64 and wall stops 65 extend along the thickness of the battery chamber cover 31 and can be associated with either of the through holes 55.

The release-side walls 63 are at the one ends of the through holes 55 and include curved portions and extend along Z axis.

The lock-side walls 64 are at the other ends of the through holes 55 to face the release-side walls 63. The lock-side walls 64 include expanded portions and are inclined to Z axis to widen an interval with the release-side walls 63.

The wall stops 65 are at the one ends of the through holes 55 and inclined from the one ends to −X axis.

The grooves 66 are formed in a part of the end walls of the through holes 55 to allow the through holes 55 to communicate with outside of the lock element 51.

The pair of protruded guides 67 are provided on both sides of the lock element 51 between the pressed portion 62 and the one ends of the through holes 55, and extend along X axis. They are inserted into the guide grooves 46b (FIG. 8) to move the lock element 51 along X axis in the depression 36, limit the moving amount thereof along Y axis, and prevent it from moving along Z axis. Thus, the lock element 51 moves in parallel along X axis in the depression 36.

Figure 9C:
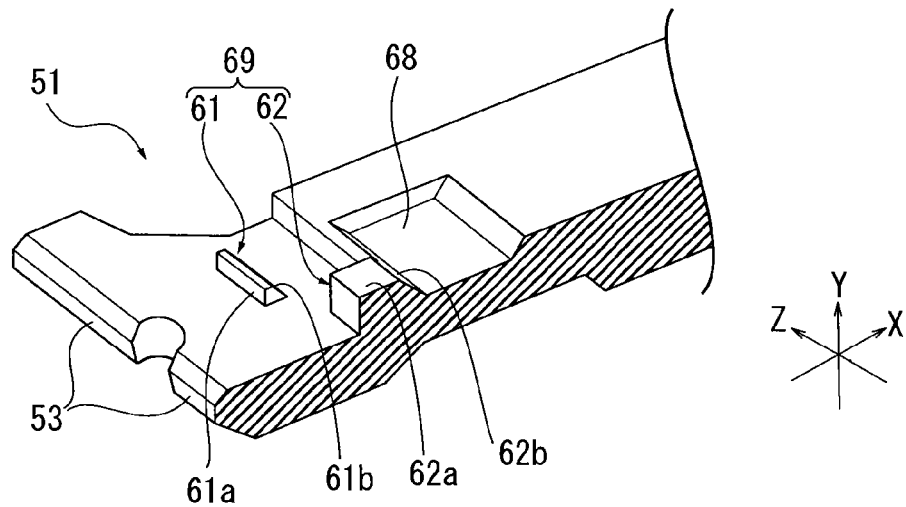
FIG. 9C is an enlarged, perspective view of one end of the lock element 51 cut along the I- to I line in FIG. 9B.

The concave 68 is provided near the pressed portion 62 and continue from the rear face 62b thereof in FIG. 9C, to receive the plan surface 34e of the first convex 34 in non-contact manner when the lock element 51 is in the lock position in the closed battery chamber cover 31 and the first convex 34 of the seal element 34 is moved by the protrusion 26 along −Y axis in FIG. 12C.

The coil spring 52 is a coiled wire and can wind around the convex 44b of the elastic element mount 44 in the depression 36. It is extended most with no load applied and exerts elasticity against compression. The compressed coil spring 52 can be accommodated in the elastic element holder 56 of the lock element 51 in FIG. 13A. While the lock element 51 is in the lock position in the depression 36, the coil spring 52 is compressed by a predetermined amount in the elastic element holder 56 in FIGS. 13B, 13C.

The lock element 51 and coil spring 52 as configured above are provided in the depression 36 inside the cover body 33 as indicated by the arrows A11, A12 in FIG. 7. The lock element 51 is held in the depression 36 by the pair of protruded guides 67 fitted into the guide 46 and can move in parallel along the length of the battery chamber cover 31. One end 52a of the coil spring 52 winds around the convex 44b and is contained in the elastic element holder 56 while the other end 52b hits the one end 56a of the elastic element holder 56. The coil spring 52 presses the one end 56a from the elastic element mount 44 to move the lock element 51 to the lock position along X axis in FIGS. 13A to 13C. The coil spring 52 functions as an elastic element of the lock mechanism 32. The protrusion 54 of the lock element 51 is placed in the opening 41 of the cover body 33 while the bearings 42 of the cover body 33 are placed in the through holes 55, respectively. Then, the latch portion 53 of the lock element 51 face the hole 38 of the cover body 33 in the depression 36.

The top end of the cover body 33 contacts the seal element 34 with the ring-like metal washers 71 in the concaves 34d and the second convex 34c of the seal element 34 contacts the plate 35. The two screw holes 43 of the cover body 33, the two screw holes 34a of the seal element 34, and the two screw holes 35a of the plate 35 are now aligned on the straight line as indicated by the arrow A14 in FIG. 7. The first convex 34 of the seal element 34 is inserted into the opening 35b of the plate 35 as indicated by the arrow A15. Then, the seal element 34 and the plate 35 are fixed to the cover body 33 by the screws 72 which each include a threaded shaft 72a and a head 72b larger than the shaft 72a. The heads 72b are inserted into the screw holes 35a of the plate 35. The shafts 72a are inserted through the inside of the metal washers 71 and screw holes 34a of the seal element 34, to engage with the screw holes 43 of the cover body 33. Thereby, the seal element 34 and plate 35 are fixed in the cover body 33.

Thus, the battery chamber cover 31 is unitized of the lock element 51 and coil spring 52 accommodated in the cover body 33 and the seal element 34 joined with the metal washers 71 and plate 35 by the screws 72. The cover body 33 is rotatable around the shaft Am via the shock absorber 40 and the battery chamber cover 31 is provided in the chassis 11 in FIGS. 1, 2. Thus, provided in the chassis 11 of the imaging device 10, the cover unit having the battery chamber cover 31 and lock mechanism 32 can close the inlet 22 of the battery chamber 17.

Figure 13A:
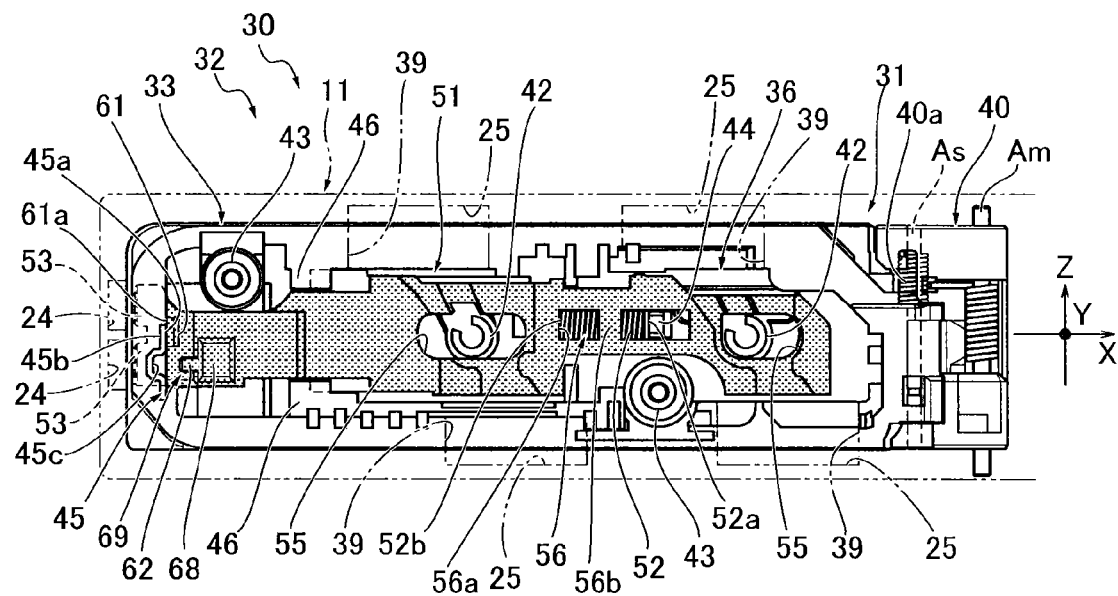
FIG. 13A shows the inner wall side of the battery chamber cover 31 with the lock element 51 in the release position.
Figure 13B:
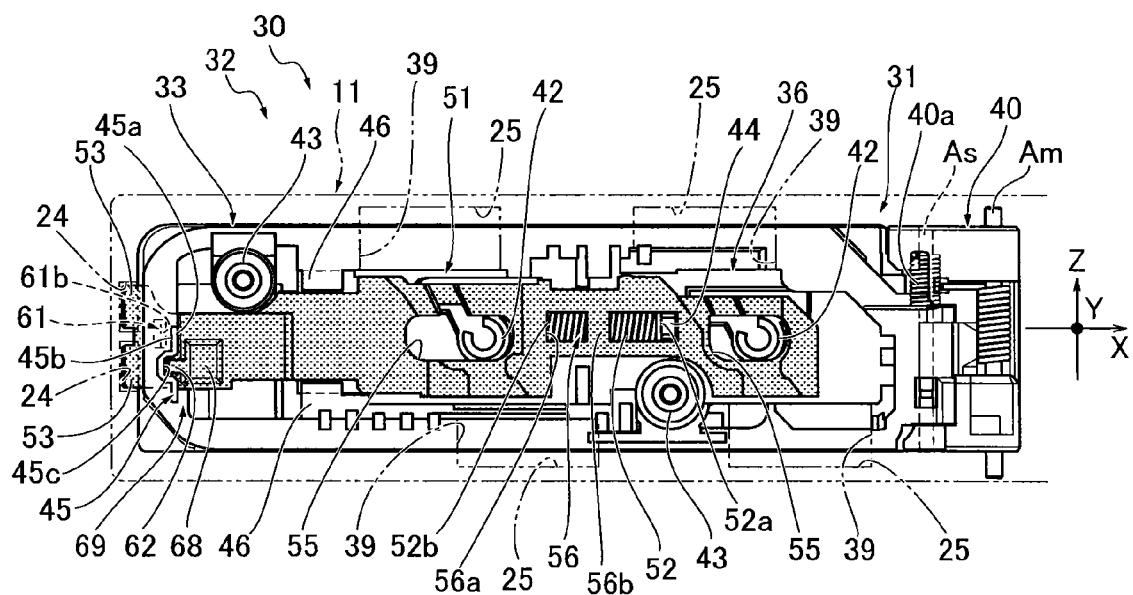
FIG. 13B shows the same with the lock element 51 in the lock position.

With the battery chamber cover 31 in the opened state, the front end 61a of the convex 61 of the lock element 51 hits the back portion 45a of the contact portion 45 in the depression 36. This is the release position of the lock element 51 as shown in FIGS. 10, 12A, 13A. At the release position, the lock element 51 is closer to one end of the battery chamber cover 31 in the length direction, the protrusion 54 is positioned in the opening 41 of the cover body 33, and the latch portion 53 is inside the hole 38 of the cover body 33. The top end 62a of the pressed portion 62 contacts the plan surface 34e of the first convex 34 of the seal element 34 along Y axis.

At the release position the coil spring 52 is compressed between the one end 56a and the elastic element mount 44 in the elastic element holder 56. The lock element 51 is pressed by the coil spring 52 along −X axis in the depression 36. However, it does not move along −X axis and can remain at the release position since the front end 61a of the convex 61 is pressed by the back portion 45a of the contact portion 45.

As described above, the opened battery chamber cover 31 is rotated around the shaft Am to close the battery chamber 17 and form a part of the bottom of the chassis 11. Here, pressed onto the inlet 22 of the battery chamber 17 via the second convex 34c of the seal element 34, the cover body 33 receives a repulsive force to open. In particular, owing to the elastic seal element 34 with the second convex 34c in the cover body 33, the second convex 34c is compressed between the cover body 33 and the edge 22a so that the battery chamber cover 31 easily receives the repulsive force in the closed state.

With the battery chamber cover 31 in the closed state, the protrusion 26 in the accommodation space 23 hits and moves along −Y axis the first convex 34 of the seal element 34 via the opening 35b of the plate 35 (FIG. 12B). Along with the movement of the first convex 34, the pressed portion 62 is pressed to −Y axis side to bend the lock element in FIG. 12B. Thus, the first convex 34 and plan surface 34e of the seal element 34 functions as the connecting portion to hit the protrusion 26 to press the pressed portion 62 to −Y axis side.

Along with this movement, the convex 61 near the pressed portion 62 is moved so that the front end 61a thereof is separated from the back portion 45a of the contact portion 45 in FIG. 12B. The lock element 51 pressed by the coil spring 52 is then moved from the release position to −X axis side in FIG. 12C. Then, the pressed portion is fitted into the concave portion 45c of the contact portion 45 to stop the movement of the lock element 51. This is the lock position of the lock element 51 as shown in FIGS. 11, 12B, 13B, 13C. The lock element 51 can be held in the lock position against the elastic force of the coil spring 52 by the elastic element mount 44 and holder 56 or any other element as long as it hits the lock element 51 and the depression 36 along X axis.

At the lock position the latch portion 53 of the lock element 51 is protruded from the battery chamber cover 31 through the hole 38 of the cover body 33. Then, the latch portion 53 enters into the hole 24 of the chassis 11 facing the hole 38. The surface of the latch portion 53 contacts the inner wall of the hole 24 but it can be prevented from being stuck in the hole 24 due to its cut-off end with a reduced thickness. Further, the concave 68 of the lock element 51 receives the first convex 34 of the seal element 34 without contacting the periphery of the plan surface 34e so that the protrusion 26 is released from the indirectly pressed state and the deformation of the lock element is resolved (FIG. 11). Then, the convex 61 is returned to the original height in the hole 38 and prevented from hitting the hole 38 due to the clearance groove 38a.

At the lock position since the surface of the latch portion 53 contacts the hole 24, the latch portion 53 is prevented from moving along −Y axis. That is, by the interference between the latch portion 53 and hole 24, the battery chamber cover 31 is pressed onto the inlet edge 22a of the cover body 33 against the repulsive force and remains in the closed state. Thus, the lock element 51, the hole 24, the protrusion 26, the accommodation space 23, and the coil spring 52 constitute the lock mechanism 32. The convex 61, pressed portion 62 of the lock element 51, and the contact portion 45 in the depression 36 function as the receive element 69, to hold the lock element 51 in the lock position against the elastic force of the coil spring 52 and release it from the lock position by the protrusion 26.

Figure 13C:
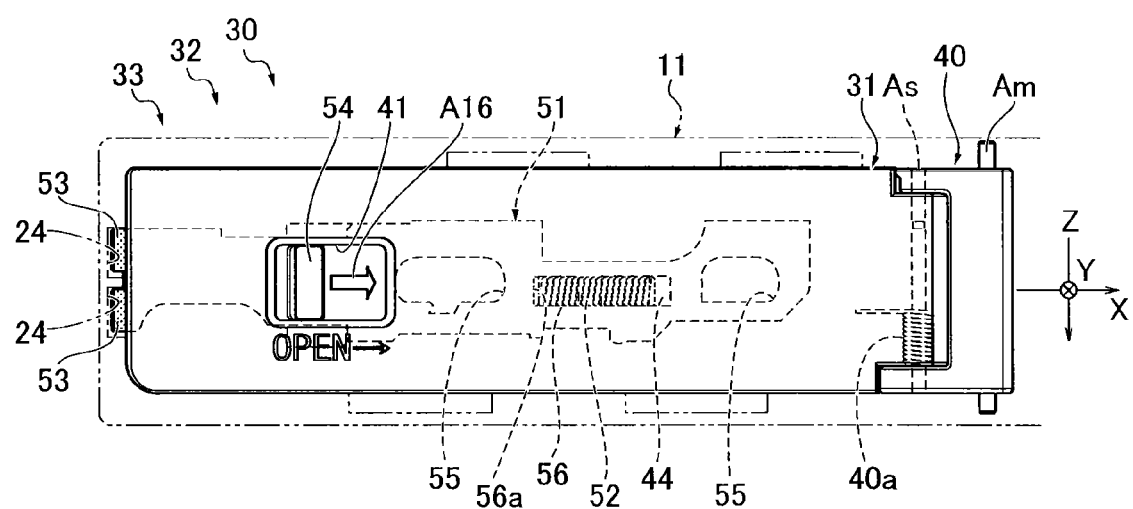
FIG. 13C shows the outer wall side of the battery chamber cover 31 with the lock element 51 in the lock position.

To release the battery chamber cover 31 from the closed state, the protrusion 54 is moved along −X axis from the opening 41 of the cover body 33 as indicated by the arrow A16 in FIG. 13C. This moves the lock element 51 to the release position from the lock position in the cover body 33. At the lock position, the rear face 61b of the convex 61 faces the front portion 45b of the contact portion 45. However, during the movement of the lock element to the release position they are prevented from being stuck with each other since the rear face is an inclined face. Therefore, the rear face 61b is relatively pressed by the front portion 45b to deform the lock element 51 so that the lock element 51 crosses over the contact portion 45. The planar surface of the pressed portion 45 making an elevation angle with the back face of the lock element 51 hits the rear face 61b of the convex 61.

Further, the rear face 62b of the pressed portion 62 faces the inclined surface 34f of the seal element 34 at the lock position. Since the rear face 62b and inclined surface 34f are both inclined surfaces, they are prevented from being stuck with each other when the lock element 51 is moved to the release position. In the battery chamber cover 31 the rear face 62b is relatively pressed by the inclined surface 34f to deform the lock element 51, thereby returning the top end 62a to the contact position with the plan surface 34e. Here, the latch portion 53 is disengaged from the hole 24, remains in the hole 38 of the cover body 33, and does not protrude therefrom.

Then, the battery chamber cover 31 is released from the closed state by the lock mechanism 32 (FIGS. 1, 12C). Now, the battery chamber cover 31 can be rotated around the shaft Am to open the battery chamber 17.

According to the cover unit 30, when the battery chamber cover 31 is turned about the shaft Am to be in the closed state, the protrusion 26 in the accommodation space 23 presses the receive element 69 to release the lock element 51 from the lock position. Because of this, the battery chamber cover 31 can be securely closed without any user's operation while pressed onto the inlet edge 22a of the battery chamber 22. Thus, the usability of the cover unit can be improved.

According to the cover unit 30, the receive element 69 works to hold the lock element 51 in the lock position against the elastic force of the coil spring 52. Therefore, the lock element 51 can remain in the lock position against a user's manipulation of the protrusion 54 via the opening 41 so that the latch portion 53 of the lock element 51 can be reliably prevented from protruding from the hole 38 of the cover body 33.

Moreover, the front end 61a of the convex 61 of the receive element 69 hits the back portion 45a of the contact portion 45. With such a simple configuration, the lock element 51 can be held in the lock position against the elastic force of the coil spring 52 and a user's manipulation of the protrusion 54.

According to the cover unit 30, the lock element 51 can be securely held in the lock position since the lock element 51 is configured to be moved in parallel by the coil spring 52 and the front end 61a of the convex 61 and the back portion 45a of the contact portion 45 are both planar surfaces along Y to Z plane.

In the cover unit 30 the latch portion 53 of the lock element 51 is prevented from protruding from the hole 38 of the cover body 33 by the receive element 69. Because of this, it is possible to prevent the hole 38 from interfering with the chassis 11 and prevent the chassis 11 from being damaged without a failure along with the movement of the battery chamber cover 31 to the closed position. It is also possible to prevent a decrease in the sealing property of the battery chamber cover 31 due to a deformation of the hole 24 into which the latch portion 53 is inserted.

The receive element 69 comprised of the convex 61 and pressed portion 62 is provided at one end of the back face of the lock element 51. Because of this, the lock element 51 can be easily deformed by pressing the pressed portion 62 along −Y axis and released from the lock position by moving the convex 61 along −Y axis over the back portion 45a of the contact portion 45.

Thus, only with the protrusion 26, the lock element 51 can be released from the lock position when the battery chamber cover 31 is closed.

According to the cover unit 30, the protrusion 26 can press the pressed portion 62 of the receive element 69 via the first convex 34 of the seal element 34 without a reduction in the sealing property of the battery chamber cover 31.

In the cover unit 30 the first convex 34 of the seal element 34 or pressed portion 62 of the receive element 69 is prevented from being erroneously pressed by the protrusion 26 since the first convex 34 is placed at a position deeper inside the battery chamber cover 31 than the back face of the plate 35. In the present embodiment the first convex 34 is of a very small size to occupy an extremely small area of the inner wall of the cover 31 defined by the plate 35.

In the cover unit 30 the rear face 61b of the convex 61 is inclined so that convex 61 and contact portion 45 do not block the parallel movement of the lock element 51 from the lock position to the release position. Further, in moving the lock element 51 from the lock position to the release position, a user can feel a clicking touch from the deformation of the lock element 51 when the convex 61 gets over the contact portion 45.

Further, the rear face 62b and inclined surface 34f of the seal element 34 are both inclined surfaces so that the pressed portion 62 and the first convex 34 do not hinder the lock element 51 from moving from the lock position to the release position.

In the cover unit 30 the coil spring 52 in the elastic element mount 44 is contained in the elastic element holder 56 of the lock element 51. Thereby, the lock element 51 can be configured to be pressed by the coil spring 52 to the lock position in the depression 36 without an increase in the size of the battery chamber cover 31.

Further, the latch portion 53 has the cut-off end so that it can be prevented from being stuck in the hole 24.

The imaging device 10 incorporating the cover unit 30 can attain improved usability since the battery chamber cover 31 can be easily locked in the closed sate by simply rotating the battery chamber cover 31, and the latch portion 53 can be prevented from protruding from the battery chamber cover 31 in the opened state.

Thus, with the cover unit 30, it is possible to prevent the latch portion 53 from protruding the opened battery chamber cover 31 and lock the battery chamber cover 31 in the closed state by simply rotating the battery chamber cover 31.

Second Embodiment

Figure 14:
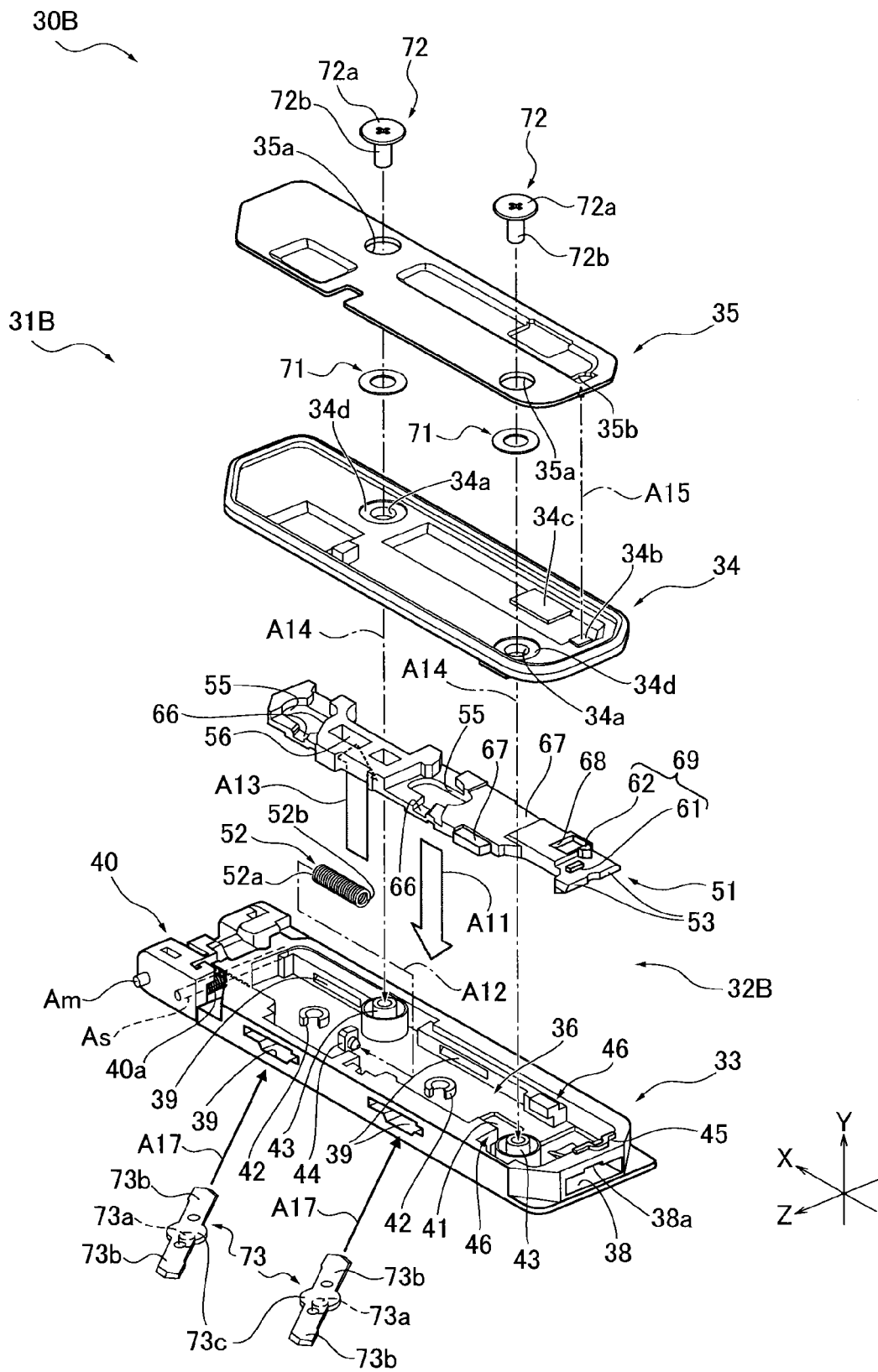
FIG. 14 is an exploded, perspective view of a battery chamber cover 31B of a cover unit 30B according to a second embodiment.
Figure 15:
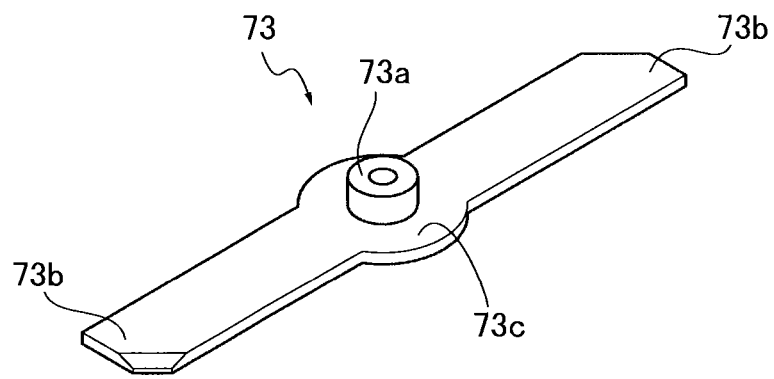
FIG. 15 is a perspective view of a hook element 73.
Figure 16:
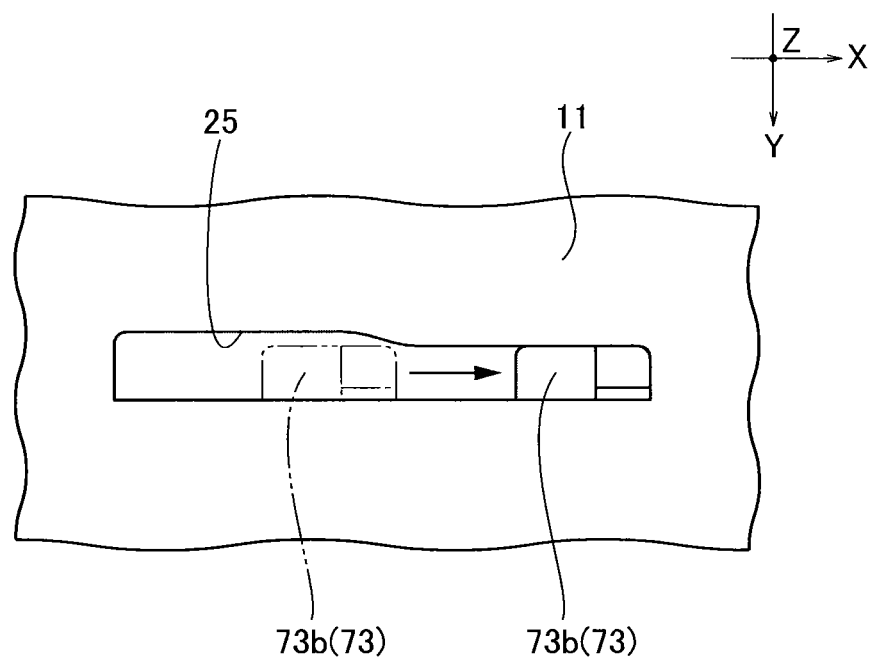
FIG. 16 shows a groove 25 relative to a latch portion 73b, seen from the arrow A2 in FIG. 19.
Figure 17:
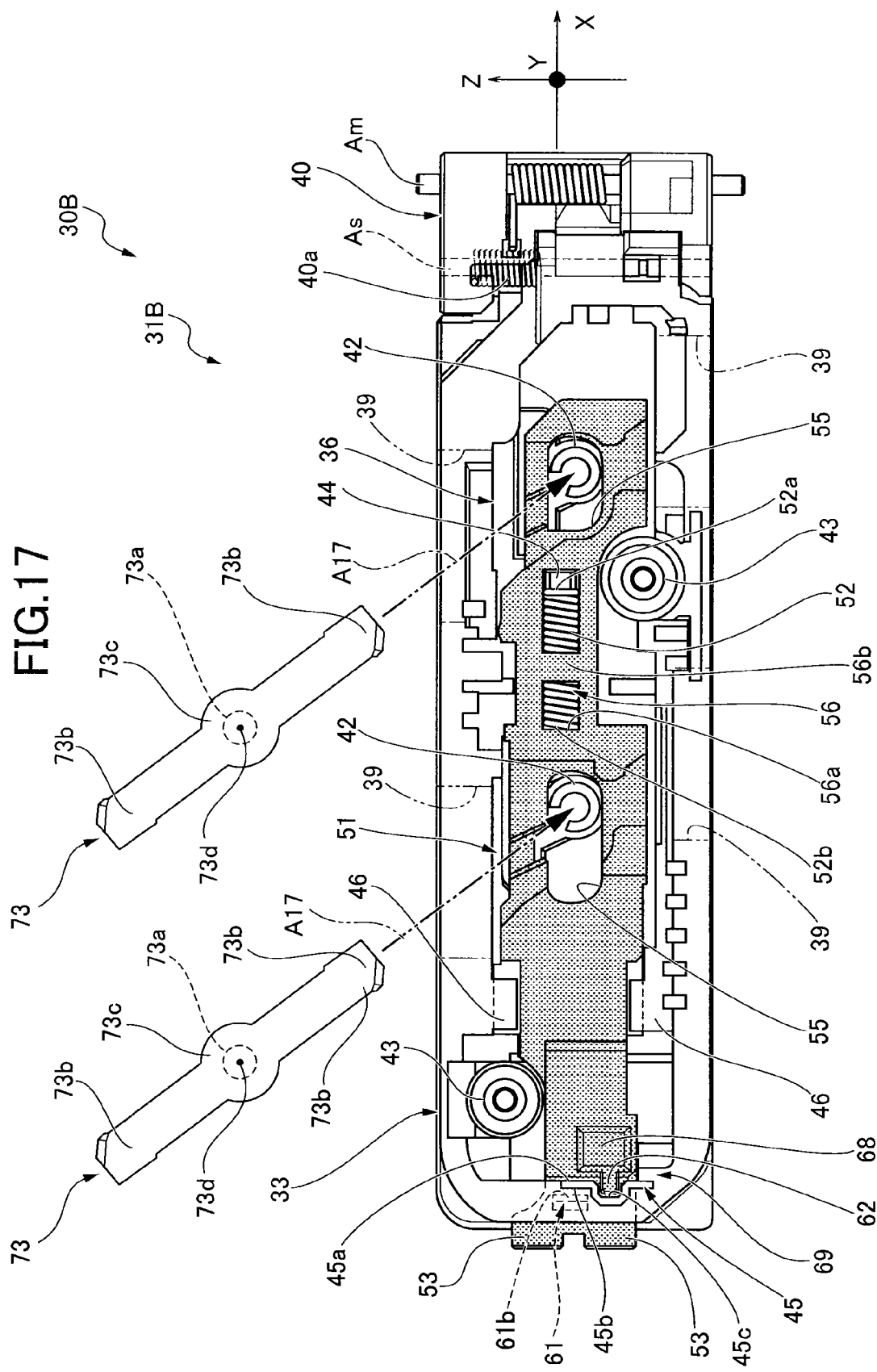
FIG. 17 shows that the hook elements 73 are being attached to the cover body 33 of the battery chamber cover 31B.
Figure 18:
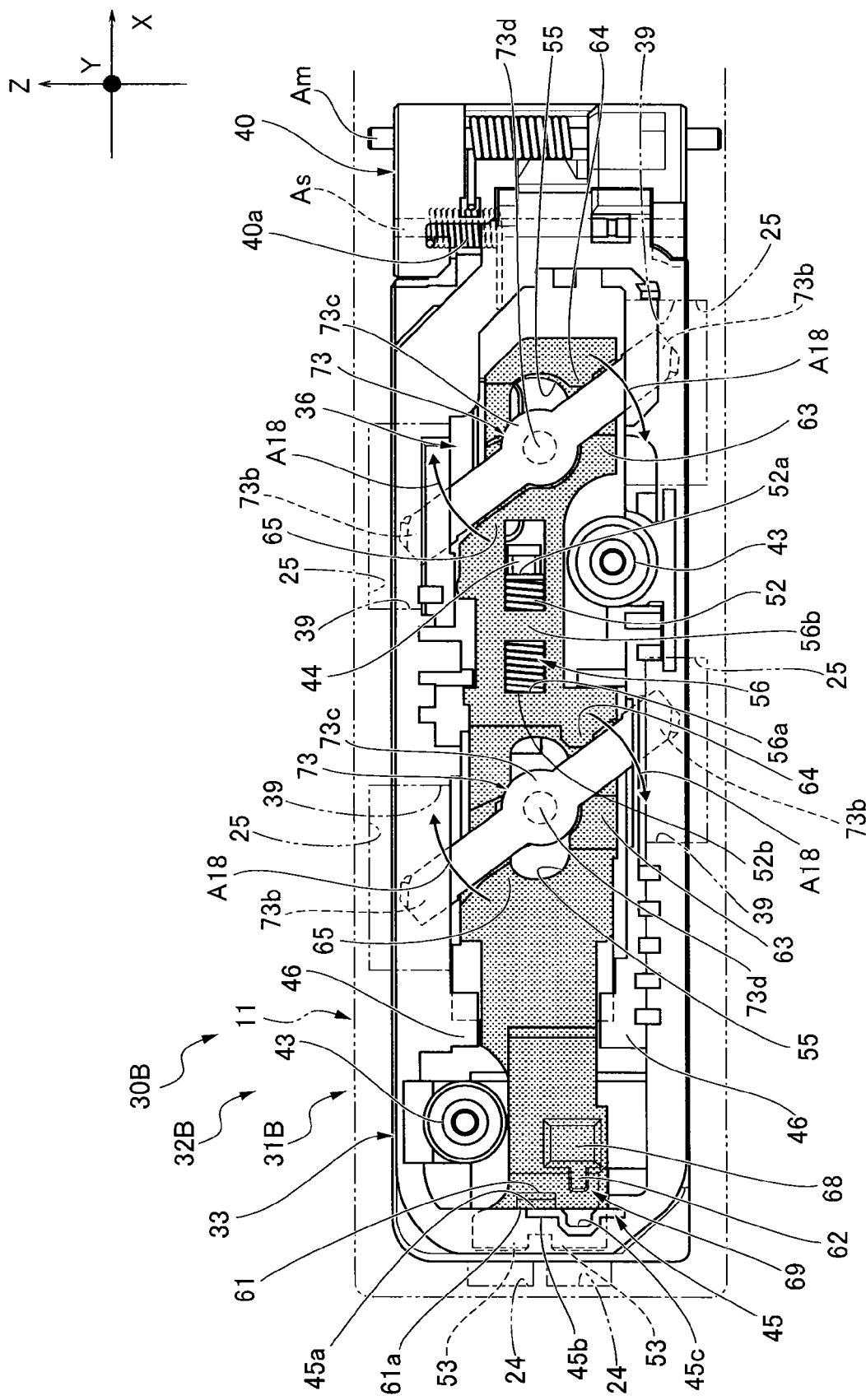
FIG. 18 shows the battery chamber cover 31B in a chassis 11 when it is released from the closed state by a lock mechanism 32B.
Figure 19:
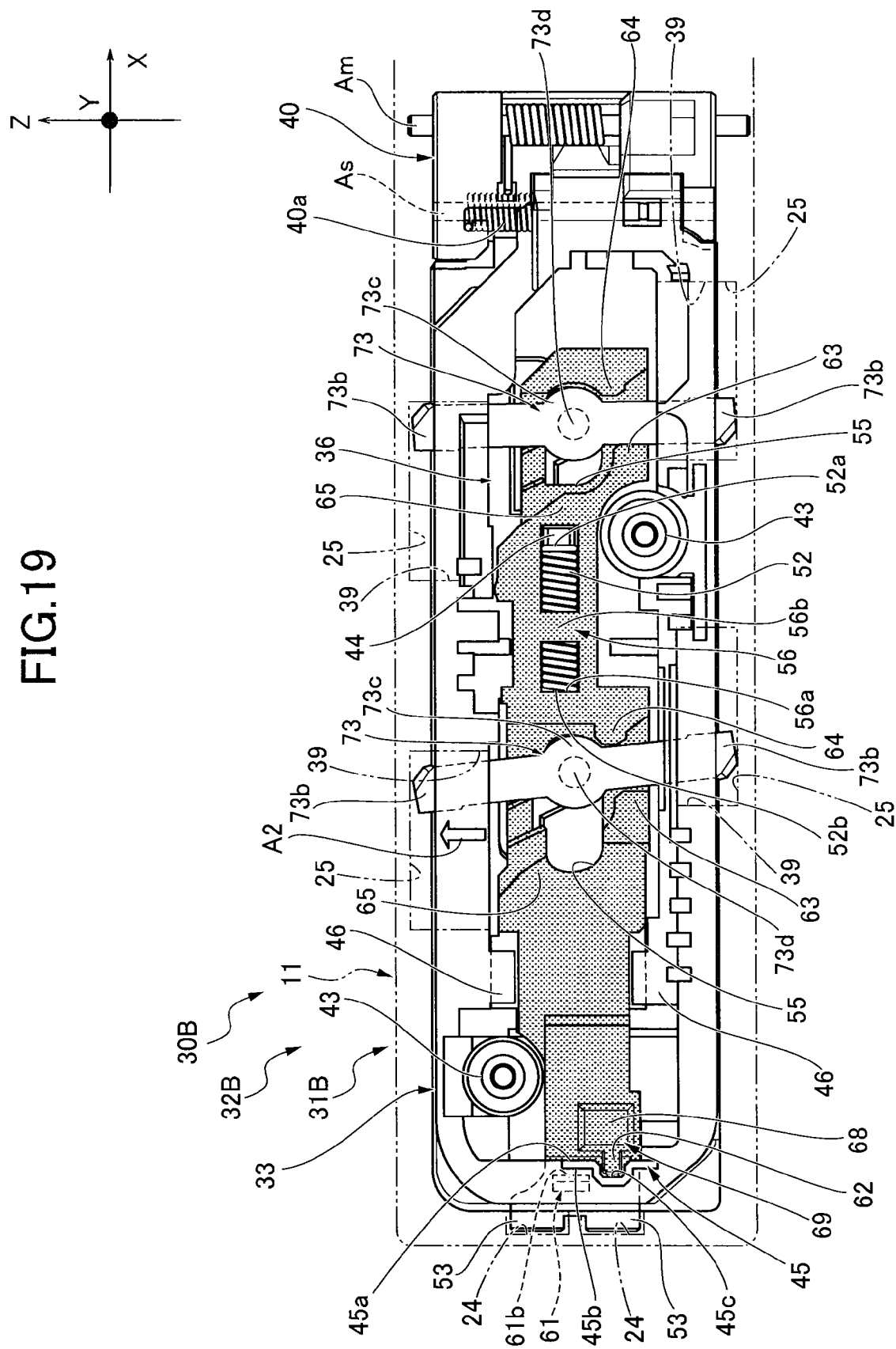
FIG. 19 shows the battery chamber cover 31B in the chassis 11 when it is locked in the closed state by the lock mechanism 32B.

Next, a cover unit 30B according to the second embodiment will be described with reference to FIG. 14 to FIG. 19. The structure of the cover unit 30B and an imaging device 10 with the cover unit 30B are basically the same as those in the first embodiment. FIG. 14 is an exploded view of a battery chamber cover 31B. FIG. 15 is a perspective view of a hook element 73. FIG. 16 shows the structure of the groove 25 relative to latch portions 73b as seen from the arrow A2 in FIG. 19. FIG. 17 shows that hook elements 73 are attached to the cover body 33. FIG. 18 shows the battery chamber cover 31B in the chassis 11 when it is released from the locked position. FIG. 19 shows the battery chamber cover 31B in the chassis 11 when it is locked in the closed position by a lock mechanism 32B.

A difference in the cover unit 30B from the cover unit 30 in the first embodiment is two hook elements 73 in FIG. 14. The two hook elements 73 constitute a part of the lock mechanism 32B together with the two bearings 42, four notches 39, four grooves 25, first and lock-side walls 63, 64, wall stops 65, and grooves 66.

The hook elements 73 are of the same structure so a single hook element 73 is described. The hook element 73 in FIG. 15 is a long plate made from a metal material and includes a rotary shaft 73a at the center and two latch portions 73b at both ends.

The rotary shaft 73a is a column standing on the hook element 73 and rotatably fitted into the bearing 42 of the cover body 33. The axis of the rotary shaft 73a or the bearing 42 of the cover body 33 is a fixed axis 73d of the hook element 73 (FIGS. 18, 19) around which the hook element 73 is rotatable relative to the battery chamber cover 31B. The fixed axis 73d is set along the thickness of the battery chamber cover 31B.

The two latch portions 73b are inserted into the grooves 25 in the chassis 11 and each include a portion with a reduced thickness at one end. The one end becomes the front when the latch portion 73b protrudes from the cover body 33 as indicated by the arrow A18 in FIG. 18 along with the rotation of the hook element 73 around the rotary shaft 73a.

The hook element 73 also includes a large diameter portion 73c of a circular form at the center. The center of the large diameter portion coincides with the axis of the rotary shaft 73a.

The latch portions 73b of the hook element 73 are inserted into the notches 39 in the depression 36 to protrude from the cover body 33 along Z axis. Also, they are inserted into the grooves 25 associated with the notches 39 and both sides thereof contact the grooves in the thickness direction of the battery chamber cover 31B (FIG. 16). Accordingly, the movement of the latch portions 73b is limited along Y axis in the grooves 25.

In the second embodiment one end of each groove 25 is set to be smaller in width than the other end, as shown in FIG. 16, and the thickness of the latch portion 73b is equal to the smaller width of the one end. Thus, since the latch portion 73b is inserted into the one end of the groove 25 as indicated by the arrow A18 in FIG. 18, it faces limitation to move along Y axis.

The cover unit 30B can be assembled in the same manner as the cover unit 30 in the first embodiment except for the attachment of the two hook elements 73 to the lock element 51. Specifically, referring to FIGS. 14, 17, the hook elements 73 are inserted into the cover body 33 via the notches 39 provided in the outer circumference wall 37b as indicated by the arrows A17. The rotary shafts 73a thereof are inserted through the middle portions of the notches 39 in a larger width and fitted into the grooves 66 and the bearings 42 in the through holes 55. The bearings 42 are C-shaped to receive the rotary shafts 73a. Thus, the hook elements 73 are rotatably placed in the cover body 33 around the axis of the bearings 42 or fixed axis 73d in the through holes 55 of the lock element 51, as shown in FIGS. 18, 19. The hook elements 73 contact, at about the large diameter portions 73c, the release-side and lock-side walls 63, 64.

The cover unit 30B functions the same as the cover unit 30 in the first embodiment. That is, with the battery chamber cover 31 in the opened state, the lock element 51 is at the release position and the latch portion 53 does not protrude from the hole 38 of the cover body 33 in FIG. 18. Here, the two hook elements 73 are inclined relative to Z axis in the notches 39 with the latch portions 73b not protruding from the cover body 33. The hook elements 73 contact and interfere with the release-side walls 63, lock-side walls 64, and wall stops 65 which extend along Y axis at the same height.

The battery chamber cover 31B is rotated from the open position to close the battery chamber 17. With the battery chamber cover 31B closed, the protrusion 26 in the accommodation space 23 moves the first convex 34 of the seal element 34 via the opening 35b of the plate 35 to move the first convex 34 along −Y axis (FIG. 12B). The pressed portion 62 is then pressed and moved by the plan surface 34e of the seal element 34 to separate the convex 61 and the contact portion 45. Thereby, the lock element 51 is moved from the release position along −X axis.

In FIG. 18 the lock-side walls 64 then press the vicinity of the large diameter portions 73c of the hook elements 73 to −X axis side and turns the hook elements 73 around the rotary shaft 73a or fixed axis 73d clockwise as indicated by the arrow A18. When the lock element 51 is moved in parallel to the lock position, the hook elements 73 are turned to be almost parallel to Z axis as in FIG. 19, and the latch portions 73b at both ends protrude from the cover body 33 via the notches 39 and enter into the grooves 25 of the chassis 11. Due to the cut-off ends of the latch portions 73b in reduced thickness, the latch portions 73b are prevented from being hooked by the opening ends of the grooves 25. As described above, the latch portions 73b are inserted into the one ends of the grooves in a smaller width and contact the walls of the grooves 25 (FIG. 16).

As shown in FIG. 19, the shaft Am, the positions at which the latch portions 73b at both ends enter the grooves 25, and the positions at which the latch portions 53 enter the holes 24 are arranged with approximately equal intervals in the battery chamber cover 31B along X axis.

While the lock element 1 is at the lock position, the latch portions 53 are prevented from moving along −Y axis in the holes 24 and the latch portions 73b are prevented from moving along the thickness of the battery chamber cover 31B in the grooves 25. That is, owing to the interference between the latch portions 53 and the holes 24 and that between the latch portions 73b and the grooves 25, the cover body 33 is pressed onto the inlet edge 22a against the repulsive force to open the battery chamber cover 31B so that the cover 31B is securely held in the closed state. Thus, in the second embodiment the lock element 51 and hook elements 73 constitute the lock mechanism 32B in cooperation with the holes 24 of the chassis 11, four grooves 25, protrusion 26 in the accommodation space 23, and coil spring 52.

To release the battery chamber cover 31B from the closed state, the protrusion 54 is moved in the opening 41 to move the lock element 51 to the release position, as in the first embodiment. Along with the lock element 51's moving away from the lock position, the release-side walls 63 press the corresponding large diameter portions 73c of the hook elements 73 to turn the hook elements 73 around the rotary shafts 73a fitted into the bearings 42 of the cover body 33 counterclockwise in FIGS. 18, 19. When the lock element 51 is placed in the release position, the hook elements 73 are rotated until the large diameter portions 73c contact the wall stops 65. The latch portions 73b then recede or are separated from the grooves 25 and stay in the notches 39 of the cover body 33 and do not protrude therefrom.

Thereby, the battery chamber cover 31B is released from the closed state and the locking by the lock mechanism 32B and free to move along Y axis. The battery chamber cover 31 can now rotate about the shaft Am to open the battery chamber 17. In the lock mechanism 32B, the release-side walls 63 and lock-side walls 64 work as the protrusion to contact the hook elements 73 and as the converter for converting the parallel movement of the lock element 51 into the rotation of the hook elements 73 around the rotary shaft 73a.

Accordingly, in the cover unit 30B the battery chamber cover 31 can be moved from the opened to closed state the same as in the cover unit 30 except for the latch portions 73b moving in the grooves 25.

The cover unit 30B according to the second embodiment basically has the same structure as that of the cover unit 30 in the first embodiment, and can attain the same effects as in the first embodiment.

In addition, since the receive element 69 can hold the lock element in the lock position against the elastic force of the coil spring 52 as elastic element, the lock element 51 cannot be moved by manipulation of the protrusion 54 through the opening 41 of the battery chamber cover 31. Thereby, it is made possible to securely prevent the latch portion 53 of the lock element 51 from protruding from the hole 38 of the cover body 33 and the latch portions 73b at both ends of the hook elements 73 from protruding from the notches 39 of the cover body 33.

Further, the battery chamber cover 31 can be held in the closed state by the lock mechanism 32B, that is, the engagement of the latch portion 53 and the hole 24 and the insertion of the latch portions 73b of the hook elements 73 into the grooves 25 of the chassis 11. The battery chamber cover 31 can be evenly pressed onto the inlet 22 of the battery chamber 17.

Further, the lock mechanism 32B includes the two hook elements 73 with the latch portions 73b arranged in the longitudinal direction of the battery chamber cover 31. Because of this, the battery chamber cover 31 can be evenly pressed onto the inlet 22 of the battery chamber 17.

Further, in the cover unit 30B the cover body 33 is pressed onto the edge 22a against the repulsive force of the cover 31's moving from the closed position to the opened position by the lock mechanism 32B, that is, the engagement of the latch portions 53 and holes 24 and the engagement of the latch portions 73b of the hook elements 73 and the grooves 25. Because of this, with a small load on the latch portions 53 and 73b, the battery chamber cover 31 can be evenly pressed onto the inlet 22 of the battery chamber 17. Owing to a reduction in the required strength of the latch portions 53 and 73b, the structure thereof can be very simplified.

According to the cover unit 30B in the second embodiment, the converter as the release-side and lock-side walls 63, 64 can convert the parallel movement of the lock element 51 of the lock mechanism 32B into the rotation of the two hook elements 73 around the rotary shaft 73a. Thus, with a simple structure, the locking of the battery chamber cover 31 and releasing it from the locking can be switched by the movement of the lock element 51 along X axis.

Further, the lock mechanism 32B is of a simple structure that the release-side walls 63 or lock-side walls 64 of the converter press the hook elements 73 decentered from the rotary shafts 73a along Z axis.

Furthermore, in the lock mechanism 32B the converter is configured to convert the parallel movement of the lock element 51 into the rotation of the hook elements 73 around the rotary shafts 73a by pressing the decentered hook elements 73 with the release-side or lock-side walls 63, 64. Thus, the converter can be easily formed of the pairs of the release-side and lock-side walls 63, 64 arranged lengthwise in the lock element 51 for a number of hook elements 73 in the single lock element 51.

Further, in the lock mechanism 32B the release-side walls 63 of the converter contact one side of the larger diameter portion 73c of the hook element 73 along X axis while the lock-side walls 64 contact the other side thereof. Because of this, the rotary direction of the hook element 73 can be easily reversed by moving the lock element 51 in opposite directions along X axis. Thus, with a simple structure, it is possible to switch the locking and releasing of the battery chamber cover 31 by changing the moving direction of the lock element 51.

According to the cover unit 30B, the insertion of the latch portion 53 into the hole 24, the insertion of the pairs of latch portions 73b into the grooves 25 at both ends, and the shaft Am in the accommodation space 23 are set with approximately equal intervals along the length of the battery chamber cover 31 along X axis. Because of this, the battery chamber cover 31 can be more evenly pressed onto the inlet 22 of the battery chamber 17.

Moreover, the four grooves 25 and hole 24 of the lock mechanism 32B are provided at the same height in the accommodation space 23 of the chassis 11. Accordingly, the battery chamber cover 31 can be more evenly pressed onto the inlet 22 of the battery chamber 17.

Since the battery chamber cover 31 can be locked in the closed state by the lock mechanism 32B while evenly pressed onto the inlet 22 of the battery chamber 17, the second convex 34c of the seal element 34 can be very tightly attached to the edge 22a of the inlet 22. Accordingly, the water-tightness or water-proof function of the seal element 34 can be improved.

According to the cover unit 30B, one end of each latch portion 73b is formed so that the thickness thereof gradually decreases towards outside. This prevents the latch portions from being hooked by the ends of the grooves 25.

Thus, in the cover unit 30B it is able to prevent the latch portions 53, 73b from protruding from the battery chamber cover 31 in the closed state and lock the battery chamber cover 31 in the closed state by simply rotating it.

The cover unit should not to be limited to the above embodiments. It can be arbitrarily configured as long as it comprises a cover element to enclose an opening of a chamber of a chassis, rotatably supported at one end of the opening around an axis set at the one end, and a lock mechanism to lock the cover element in the chassis while the cover element is pressed onto an edge of the opening, the lock mechanism including a lock element contained in the cover element and movable in parallel between a lock position and a release position, and having a latch portion to protrude from the cover element at the lock position, an elastic element provided in the cover element to press the lock element to the lock position, a hole provided in the chassis, to receive the latch portion protruding from the cover element and restrict a movement of the latch portion in a direction orthogonal to a front surface of the cover element, a receive element provided in the cover element, to hold the lock element in the release position against the elastic element, and a protrusion provided in the chamber, to protrude in the orthogonal direction to press the receive element when the cover element is pressed onto the edge of the opening, in which the receive element is configured to release the lock element from the release position, when pressed in the orthogonal direction.

The above embodiments have described an example of the cover unit where the battery chamber 17 is opened/closed with the cover element and the cover element is locked with the lock mechanism. However, the present invention should not to be limited to such an example. The cover unit can be arbitrarily configured as long as it includes a cover element to open/close a chamber in a chassis and a lock mechanism to lock the cover element.

The above embodiments have described an example where the lock element 51 is bent when the pressed portion 62 or first convex 34 is pressed to −Y axis direction by the protrusion 26 in the accommodation space 23. The present invention should not be limited to such an example. Alternatively, the lock element 51 can be moved along −Y axis as long as the front end 61a of the convex 61 can be separated from the back end 45a of the contact portion 45.

The above embodiments have described an example where the pressed portion 62 of the lock element 51 is pressed by the protrusion 26 in the accommodation space 23 via the first convex 34 of the seal element 34. Alternatively, the pressed portion 62 can be pressed directly by the protrusion as long as the front end 61a of the convex 61 and the back end 45a of the pressed portion 45 are separated.

The above embodiments have described an example where the convex 61 and pressed portion 62 as the receive element are provided on the lock element 51. The present invention should not be limited to such an example. The receive element can be formed differently as long as it can release the lock element 51 from the lock position by the protrusion 26. Alternatively, the convex and pressed portion can be integrated, for example.

The above embodiments have described an example where the rear face 61b of the convex 61 is inclined. Alternatively, the front portion 45b of the contact portion 45 can be inclined or both of the rear face 61b and the front portion 45b can be inclined.

The above embodiments have described the imaging device having the battery chamber 17 as an example of the electronic device. The present invention should not be limited to such an example. It can be any electronic device with a chamber including a long opening for the chassis.

The second embodiment has described an example where the two hook elements 73 are provided in the lock mechanism 32B in the length direction. However, the number of the hook elements 73 can be set arbitrarily with the rigidity of the cover 31 taken into account.

Although the present invention has been described in terms of exemplary embodiments, it is not limited thereto. It should be appreciated that variations or modifications may be made in the embodiments described by persons skilled in the art without departing from the scope of the present invention as defined by the following claims. The numbers, positions, forms, and sizes of the elements can be arbitrarily set.

What is claimed is:

1. A cover unit of an electronic device that includes an image sensor, the cover unit comprising:
    a cover element to enclose an opening of a chamber of a chassis, rotatably supported at one end of the opening around an axis set at the one end; and
    a lock mechanism to lock the cover element in the chassis while the cover element is pressed onto an edge of the opening, the lock mechanism including
        a lock element contained in the cover element and movable in parallel between a lock position and a release position, and having a latch portion to protrude from the cover element at the lock position,
        an elastic element provided in the cover element to press the lock element to the lock position,
        a hole provided in the chassis, to receive the latch portion protruding from the cover element and restrict a movement of the latch portion in a direction orthogonal to a front surface of the cover element,
        a receive element provided in the cover element, to hold the lock element in the release position against an elastic force of the elastic element, and
        a protrusion provided in the chamber, to protrude in the orthogonal direction to press the receive element when the cover element is pressed onto the edge of the opening, wherein
    the receive element is configured to release the lock element from the release position, when pressed by the protrusion in the orthogonal direction by rotating the cover element around the axis set at the one end.

2. A cover unit according to claim 1, wherein the receive element comprises:
    a convex protruding element in the orthogonal direction from a back face of the lock element to hit the cover element at a front end when the lock element is at the release position, and
    a portion pressed by the protrusion to move the convex protruding element so that the convex protruding element is released from hitting the cover element.

3. A cover unit according to claim 2, wherein
the pressed portion is more depressed than an inner wall of the cover element on the opening side.

4. A cover unit according to claim 2, wherein:
    the cover element comprises a contact portion to hit the front end of the convex protruding element to hold the lock element in the release position; and
    the contact portion includes a planar surface orthogonal to the moving direction of the lock element to hit the front end of the convex protruding element, and a planar surface inclined relative to the moving direction and making an elevation angle with the back face of the lock element to hit a back end of the convex protruding element.

5. A cover unit according to claim 2, wherein:
    the cover element comprises
        a cover body rotatably supported by the one end of the opening around the axis and including a depression with an opening at one end, in which the lock element is accommodated movably in parallel,
        a seal element attached to the cover body, covering the opening end of the depression and including a connecting portion to contact the pressed portion of the receive element of the lock element in the orthogonal direction, and
        a plate attached to the cover body in a circumferential edge of the seal element and including an opening to expose the connecting portion from the opening of the chamber; and
    the protrusion is configured to contact the connecting portion through the opening of the plate to press the pressed portion.

6. A cover unit according to claim 5, wherein:
    the cover body includes a mount to which one end of the elastic element is fixed;
    the lock element includes a holder to receive the other end of the elastic element fixed at one end to the mount.

7. A cover unit according to claim 1, wherein
the lock mechanism comprises
- a hook element having latch portions at both ends and provided in the cover element to be rotatable at a middle position around a fixed axis orthogonal to the front surface of the cover element,
- a converter to convert the parallel movement of the lock element to a rotation of the hook element around the fixed axis, and
- a groove provided in the chassis to receive the latch portion and limit the movement of the latch portion in the orthogonal direction;

the converter is configured to
- rotate the hook element around the fixed axis to allow both the latch portions to insert into the groove and protrude from the cover element in the orthogonal direction and along a width of the cover element orthogonal to the moving direction, when the lock element is placed in the lock position, and
- rotate the hook element around the fixed axis to extract both the latch portions from the groove and accommodate the latch portions in the cover element, when the lock element is placed in the release position.

8. A cover unit according to claim 7, wherein
the converter includes a protrusion provided in the cover element to contact the latch portions in the moving direction at a position eccentric to the fixed axis along the width of the cover element.

9. A cover unit according to claim 8, wherein
the converter includes a pair of protrusions to place the latch portions in-between them in the moving direction at the position eccentric to the fixed axis.

10. A cover unit according to claim 1, wherein the cover element comprises a seal element that is pressed by the protrusion by rotating the cover element around the axis set at the one end, so that the protrusion causes the seal element and the lock element to deform.

11. The electronic device comprising:
the chassis including the cover unit according to claim 1:
an optical system; and
the image sensor to acquire an image of a subject formed by the optical system.

* * * * *